US011175146B2

(12) United States Patent
Naman

(10) Patent No.: US 11,175,146 B2
(45) Date of Patent: Nov. 16, 2021

(54) AUTONOMOUSLY MOVING MACHINE AND METHOD FOR OPERATING AN AUTONOMOUSLY MOVING MACHINE

(71) Applicant: Manuj Naman, Coppell, TX (US)

(72) Inventor: Manuj Naman, Coppell, TX (US)

(73) Assignee: Anantak Robotics Inc., Dallas, TX (US)

( * ) Notice: Subject to any disclaimer, the term of this patent is extended or adjusted under 35 U.S.C. 154(b) by 302 days.

(21) Appl. No.: 15/976,546

(22) Filed: May 10, 2018

(65) Prior Publication Data

US 2019/0128677 A1 May 2, 2019

Related U.S. Application Data

(66) Substitute for application No. 62/504,925, filed on May 11, 2017.

(51) Int. Cl.
| | |
|---|---|
| *G01C 21/00* | (2006.01) |
| *G01C 21/20* | (2006.01) |
| *G01C 21/30* | (2006.01) |
| *G06T 7/593* | (2017.01) |
| *G05D 1/00* | (2006.01) |

(52) U.S. Cl.
CPC ............. *G01C 21/30* (2013.01); *G01C 21/20* (2013.01); *G06T 7/593* (2017.01); *G05D 1/0088* (2013.01); *G06T 2207/10021* (2013.01); *G06T 2207/10028* (2013.01); *G06T 2207/30252* (2013.01)

(58) Field of Classification Search
CPC ........ G01C 21/30; G01C 21/20; G06T 7/593; G06T 2207/10028; G06T 2207/30252; G06T 2207/10021; G05D 1/0274; G05D 1/0088; G05D 1/0246
See application file for complete search history.

(56) References Cited

U.S. PATENT DOCUMENTS

| | | | |
|---|---|---|---|
| 6,356,851 B1* | 3/2002 | Young | G01C 17/38 33/356 |
| 9,989,969 B2* | 6/2018 | Eustice | G05D 1/0248 |
| 10,027,952 B2* | 7/2018 | Karvounis | G06K 9/00201 |
| 10,618,673 B2* | 4/2020 | Chan | G06T 7/246 |
| 2007/0290040 A1* | 12/2007 | Wurman | G06Q 10/087 235/385 |
| 2008/0089557 A1* | 4/2008 | Iwaki | G01S 11/12 382/106 |
| 2014/0176437 A1* | 6/2014 | Aujay | H04M 1/72544 345/158 |

(Continued)

OTHER PUBLICATIONS

Mur-Artal, Raul, et al., "ORB-SLAM: a Versatile and Accurate Monocular SLAM System", Oct. 2015, IEEE Transactions on Robotics 31(5), 18 pages.

(Continued)

*Primary Examiner* — Abby Y Lin
*Assistant Examiner* — Sohana Tanju Khayer
(74) *Attorney, Agent, or Firm* — Slater Matsil, LLP

(57) ABSTRACT

An autonomous machine and a method for operating the autonomous machine are disclosed. In an embodiment, the method includes receiving first sensor data from a first plurality of sensors supported by the machine, the first sensors covering a scene in a vicinity of the machine, generating a virtual map frame comprising a plurality of gravity patches and mapping the gravity patches and the first sensor data.

20 Claims, 12 Drawing Sheets

(56) References Cited

U.S. PATENT DOCUMENTS

| | | | |
|---|---|---|---|
| 2016/0161259 A1* | 6/2016 | Harrison | G01C 21/165 |
| | | | 701/409 |
| 2017/0193830 A1* | 7/2017 | Fragoso | G05D 1/102 |
| 2018/0232947 A1* | 8/2018 | Nehmadi | G01S 17/931 |
| 2018/0364349 A1* | 12/2018 | Kudrynski | G01C 21/30 |
| 2019/0104278 A1* | 4/2019 | Ermilios | G06T 7/223 |
| 2020/0098135 A1* | 3/2020 | Ganjineh | G06F 16/583 |
| 2020/0294401 A1* | 9/2020 | Kerecsen | G05D 1/0287 |
| 2020/0333789 A1* | 10/2020 | Suzuki | G01S 17/89 |

OTHER PUBLICATIONS

Forster, Christian, et al., "SVO: Fast Semi-Direct Monocular Visual Odometry", 2014 IEEE International Conference on Robotics and Automation (ICRA), Hong Kong, 2014, pp. 15-22.

Vogiatzis, George, et al., "Video-based, Real-Time Multi View Stereo", Image and Vision Computing Journal, Nov. 17, 2010, 15 pages.

He, Kaiming, et al., "Guided Image Filtering", IEEE Transactions on Pattern Analysis and Machine Intelligence, vol. 35, No. X, 2013, 13 pages.

Forster, Christian, et al., "IMU Preintegration on Manifold for Efficient Visual-Inertial Maximum-a-Posteriori Estimation", Robotics: Science and Systems, 2015, 10 pages.

Li, Mingyang, et al., "High-Precision, Consistent EKF-based Visual-Inertial Odometry", The International Journal of Robotics Research, vol. 32, Issue 6, Jun. 7, 2013, 33 pages.

\* cited by examiner

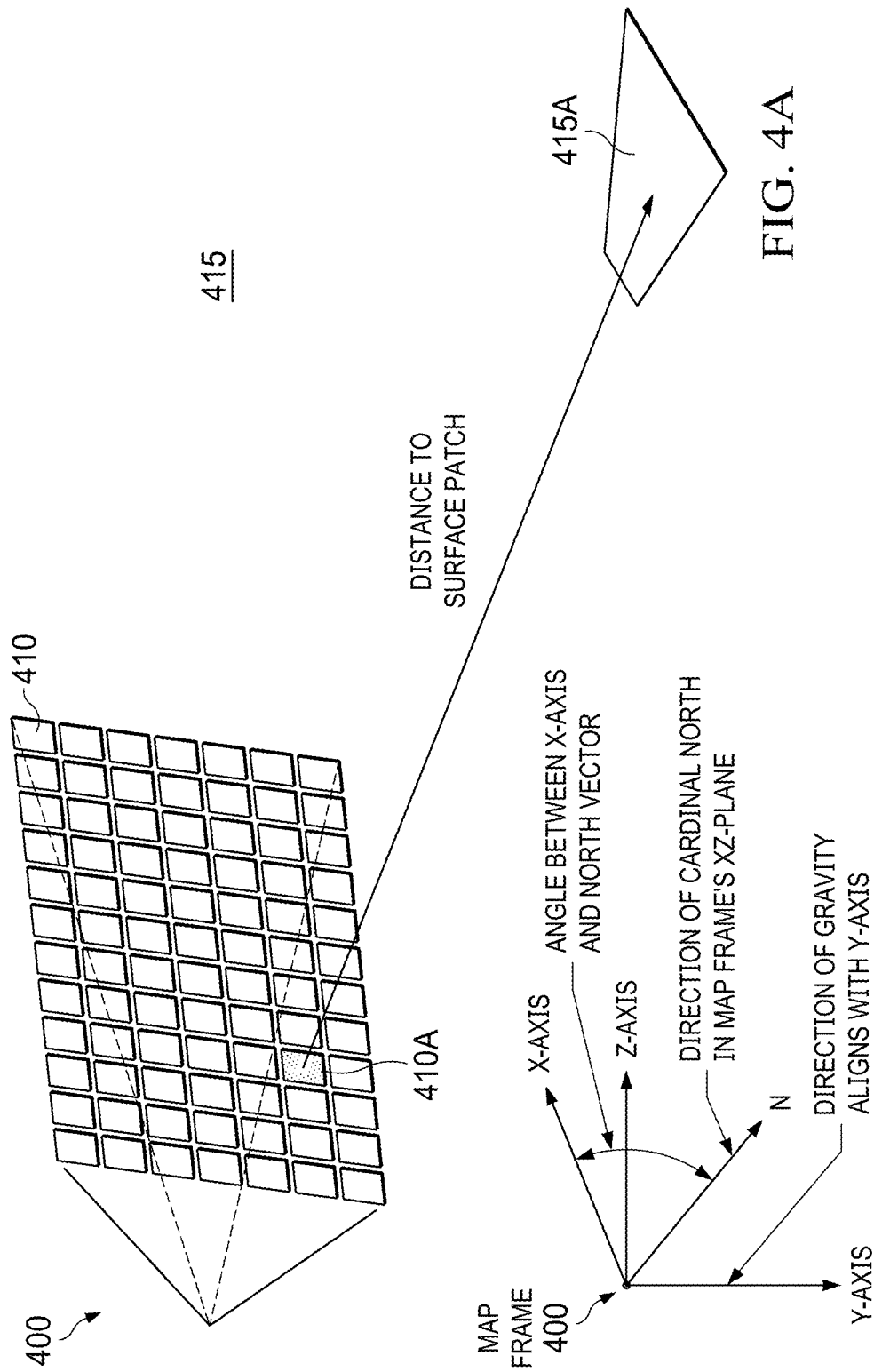

AUTONOMOUSLY MOVING MACHINE AND METHOD FOR OPERATING AN AUTONOMOUSLY MOVING MACHINE

CROSS-REFERENCE TO RELATED APPLICATIONS

This application claims the benefit of U.S. Provisional Application No. 62/504,925, filed on May 11, 2017, which application is hereby incorporated herein by reference.

TECHNICAL FIELD

The present invention relates generally to a system and methods for an autonomously moving machine, and, in particular embodiments, to a system and methods for processing sensor data.

BACKGROUND

Autonomously moving vehicles are currently developed.

SUMMARY

In accordance with an embodiment of the present invention, a method for autonomously operating a machine comprises receiving first sensor data from a first plurality of sensors supported by the machine, the first sensors covering a scene in a vicinity of the machine, generating a map frame comprising a plurality of gravity patches and mapping gravity patches and the first sensor data.

In accordance with an embodiment of the present invention, a method for generating a current map frame comprising a plurality of patches includes assigning to the patches of the map frame to a stereo image so that each patch represents a portion of the stereo image, assigning a patch normal to each patch, the patch normal representing a direction of each patch relative to a gravity normal and relative to a cardinal direction of the map frame and assigning a first patch depth to each patch, the first patch depth representing a first distance of each patch to an environmental feature.

In accordance with an embodiment of the present invention, a method for generating a series of map frames includes generating a first map frame comprising a first plurality of patches, each patch comprising a distance to an environmental feature and generating a second map frame comprising a second plurality of patches, the second map frame being generated after the first map frame, each patch of the second map frame comprising a distance to the environmental feature.

In accordance with an embodiment of the present invention, a method for matching two images identifying, by a main computing unit, a source location in a source image, identifying, by the main computing unit, a target region in a target image related to the source image, selecting, by the main computing unit, a source patch texture around the source location and selecting, by the main computing unit, a target patch texture over the target region. The method further includes calculating, by the main computing unit, a cost volume, reducing, by the main computing unit, the cost volume and matching, by the main computing unit, the source location in the source image to a target location in the target image, wherein matching the source location to the target location comprises matching the location with a likelihood.

In accordance with an embodiment of the present invention, a machine includes a processor and a non-transitory computer readable storage medium storing programming for execution by the processor, wherein the programming includes instructions to receive first sensor data from a first plurality of sensors supported by the machine, the first sensors covering a scene in a vicinity of the machine, generate a map frame comprising a plurality of gravity patches and project the first sensor data to the gravity patches.

In accordance with an embodiment of the present invention, a machine includes a processor and a non-transitory computer readable storage medium storing programming for execution by the processor, wherein the programming includes instructions to assign a stereo image to patches of the map frame so that each patch represents a portion of the stereo image, assign a patch normal to each patch, the patch normal representing a direction of each patch relative to a gravity normal and relative to a cardinal direction of the map frame and assign a first patch depth to each patch, the first patch depth representing a first distance of each patch to an environmental feature.

In accordance with an embodiment of the present invention, a machine includes a processor and a non-transitory computer readable storage medium storing programming for execution by the processor, wherein the programming includes instructions to identify a source location in a source image, identify a target region in a target image related to the source image, select a source patch texture around the source location, select a target patch texture over the target region, calculate a cost volume, reduce the cost volume and match the source location in the source image to a target location in the target image, wherein matching the source location to the target location comprises matching the location with a likelihood.

BRIEF DESCRIPTION OF THE DRAWINGS

For a more complete understanding of the present invention, and the advantages thereof, reference is now made to the following descriptions taken in conjunction with the accompanying drawings, in which:

FIG. 4A shows an embodiment of a map frame;

DETAILED DESCRIPTION OF ILLUSTRATIVE EMBODIMENTS

Figure 1A:
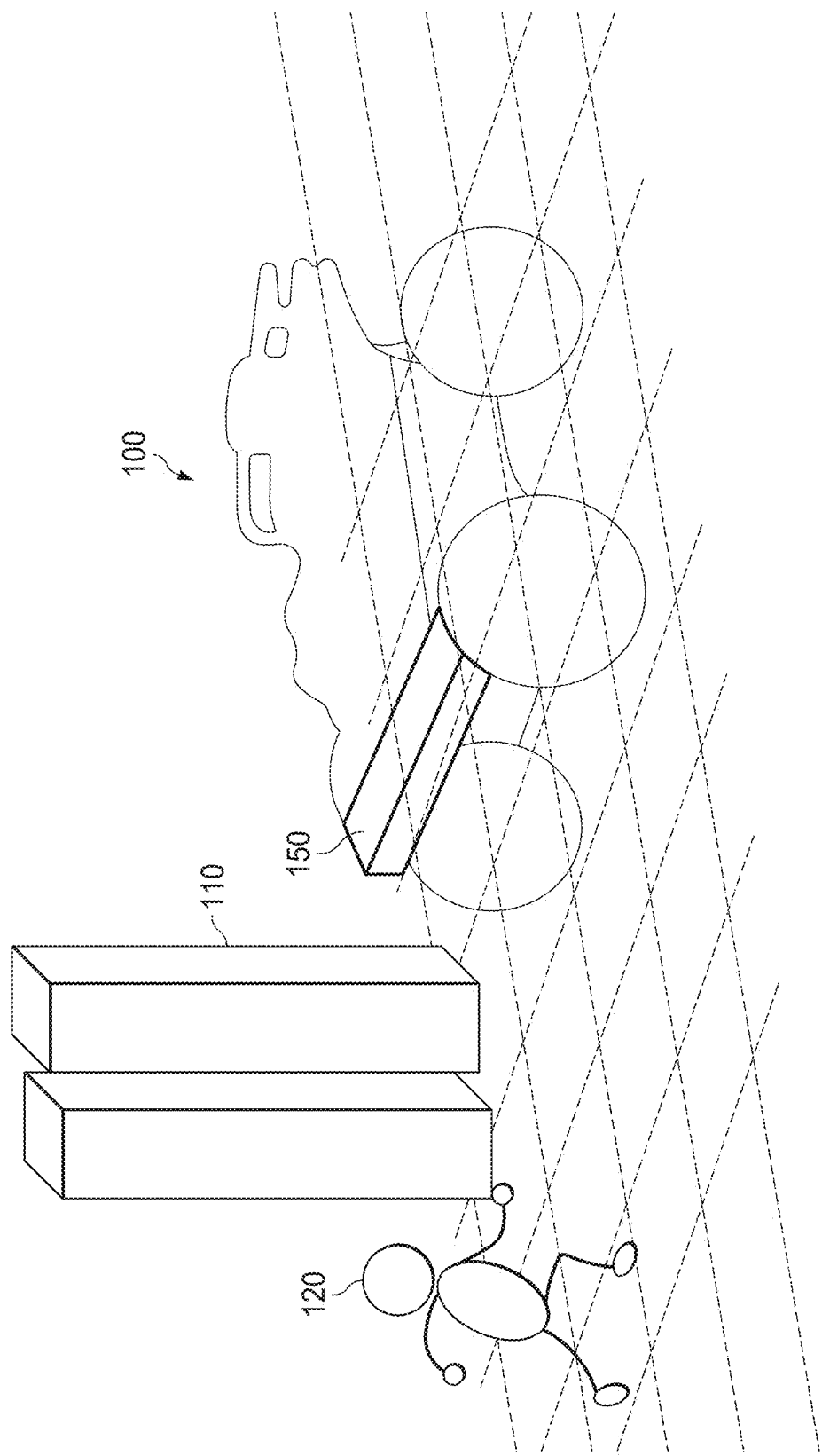
FIG. 1A shows an autonomous vehicle moving in an environment.

Embodiments of the invention provide a method for autonomously moving a machine such as a vehicle, a vessel or an aircrafts around. The machine's motion and movements are based on optical sensor data such as three dimensional (3D) images. These 3D images or pictures may be provided from multiple sensors. Using multiple sensors advantageously provides redundancy and robustness because a failure of one or a plurality of sensors can be tolerated so that the machine can still reliably move around.

Embodiments of the invention provide a method for operating the autonomous vehicle based on a patch cloud generated from the images. The patch cloud is an ordered set of frames of patches called a patch frame. In various embodiments the patches are oriented (hence gravity patches) and objects can be fit to the world of the ordered patch cloud (or cloud frame). Operating the machine based on the patch cloud according to embodiments of the invention saves computing power and allows operating multiple sensors at the same time with limited computing power.

Embodiments of the invention provide generating images based on the views of RGB sensors or cameras and depth sensors. The generated images are matched and projected onto the patches. One patch may include tens, hundreds, thousands or tens of thousands of pixels.

Embodiments of the invention provide a method for operating the machine based on a local map or limited view. The map can be created or provided. The map may be iteratively and continuously updated. In various embodiments, the map is generated based on a certain number of cycles only, i.e., information from older cycles is discarded while information from newer cycles is added. Such a method advantageously allows the machine to be operated on a low power computing device or on a computing device with only limited computing power available. Moreover, in various other embodiments, the storage device never reaches its limits because frames are continuously discarded and storage space is cleared. Advantageously, this allows the machine to be turned on (almost) indefinitely without the need to be turned off in order to clear the storage.

Embodiments of the invention allow the autonomous machine to navigate in an unmapped environment. The vehicle can identify and reconstruct the ground, the terrain or the path, and can identify static and moving obstacles in the environment in which it moves. The method may run in real time or in near real time on-board the machine. The machine may be equipped with a sensor unit comprising a plurality of sensors and cameras and a computing device (e.g., GPU-equipped computer). Alternatively, the machine may comprise a plurality of sensor units.

Embodiments of the invention provide a simple and efficient method for matching images of several sensors and cameras (RGB sensors/cameras and depth sensors/cameras) for generating a patch cloud. The method provides matching of temporal images of the same sensor/cameras, matching of images of different sensors/cameras or a combination thereof. In various embodiments the sensor unit or the machine does not comprise or operate a laser.

Embodiments provide a machine operable on probabilistic (static or dynamic stereo) image matching. The machine may not be operable based on a deterministic image matching model.

FIG. 1A shows an autonomous vehicle 100 moving around in an environment. The environment comprises of ground (e.g., a road, street, dirt path or an off road surface). The environment may further comprise obstacles such as fixed 110 or moving 120 obstacles. The autonomous vehicle 100 is able "see" the environment and to detect the obstacles 110, 120. The autonomous vehicle 100 is further able to move around these obstacles 110, 120 along a drivable path 140. If no path is available or if a movable obstacle 120 (such as an animal or a person) moves, jumps or falls into the forecasted or desired path, the vehicle 100 stops automatically. The vehicle 100 can see or detect the environment via a sensor unit 150. The sensor unit 150 may be located at the front of the vehicle 100. An additional sensor unit may be fixed to the vehicle 100 at the rear of the vehicle 100 so that it can drive backwards. In various embodiments, the vehicle 100 may not be a ground vehicle but an aircraft or a vessel. In other embodiments, the vehicle 100 may be a robot in a manufacturing facility, storing facility (warehouse) or other industrial facility. Accordingly, instead of referring to a vehicle, aircraft, vessel etc., the application may refer to a machine. Depending on the application, the machine may comprise more than two sensor units such as 3, 4, 5, 6 or more sensor units.

Figure 2:
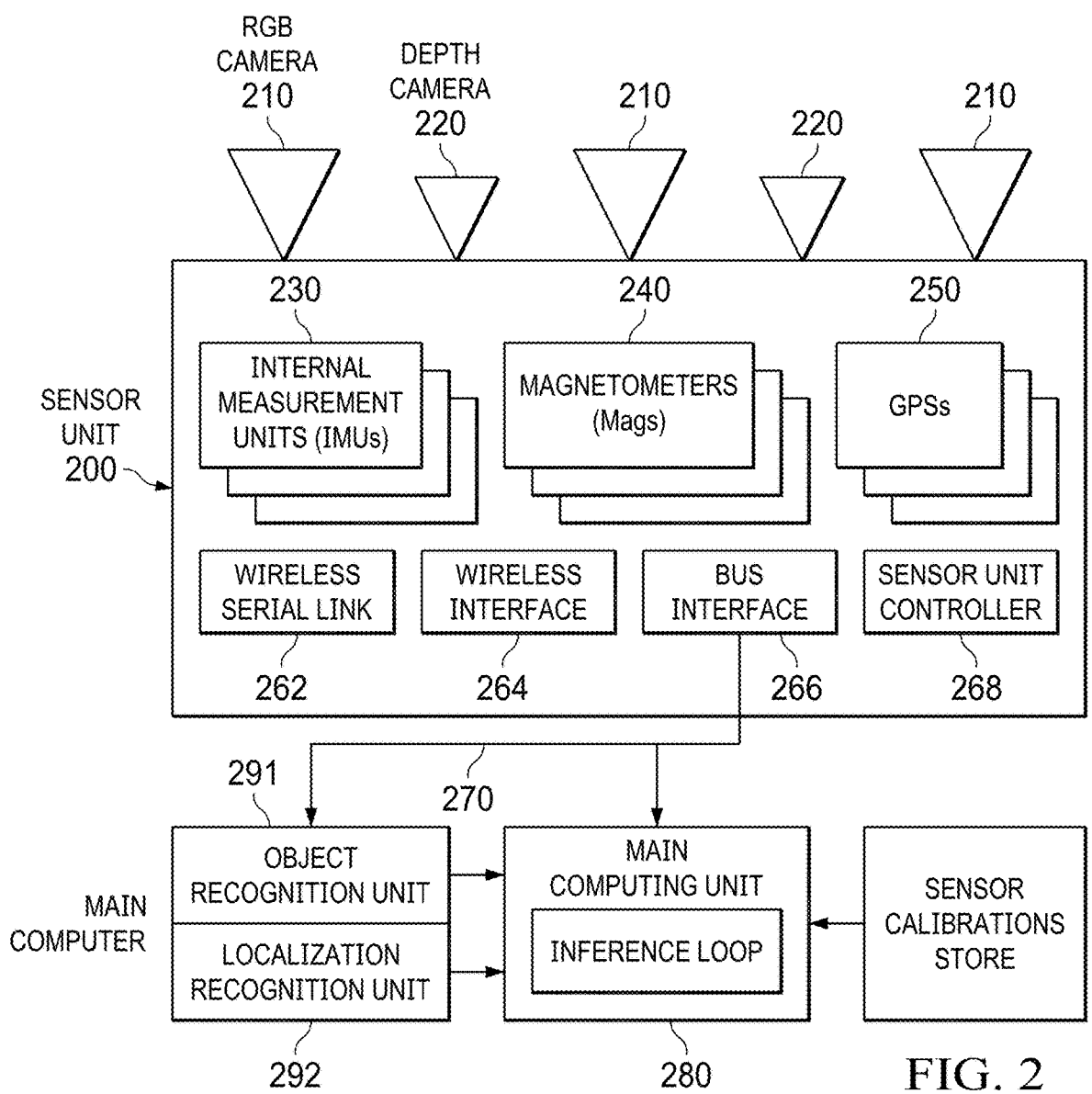
FIG. 2 shows a block diagram of a sensor unit according to an embodiment.

FIG. 2 shows a block diagram 200 of a sensor unit 200. The sensor unit 200 may comprise a plurality of sensors. For example, the sensor unit 200 comprises two or more RGB sensors or cameras 210, two or more infrared cameras (IR) sensors or cameras 220 (also called depth cameras), one or more internal measurement unit (IMUs) 230, one or more magnetometers (mags) 240 and one or more GPSs 250. The sensor unit 200 further comprises a wireless serial link 262, a wireless interface 264, a wireline interface 266 and a sensor unit controller 268. The sensor unit controller 268 is internally connected to the sensors 210-250 and the units 262-266 via an internal bus. In some embodiments the sensor unit 200 may comprise only RGB sensors/cameras 210 and only one or no IR sensors/cameras 220 or only IR sensors/cameras 220 and no RGB sensors or cameras 210. The sensor unit 200 may include a single IMU 230, a single mag 240 and a single GPS 250. Alternatively, the sensor unit 200 includes a plurality of IMUs 230, a plurality of mags 240 and a single or a plurality of GPS(s) 250 (typically two or three for each 230, 240 and 250). The plurality of IMUs 230, mags 240 and GPS 250 may be provided for robustness in case one of the IMUs 230, mags 240 or GPSs 250 fails so that the machine 100 with the sensor unit 200 is still operable. For similar reasons, there may be more than 2 RGB sensors/cameras 210 (e.g., 3 or 4 RGB sensors/cameras) or more than 2 IR sensors/cameras 220 (e.g., 3 or 4 IR sensors/cameras). More RGB sensors/cameras and IR sensors/cameras can be added to increase the field of view. The sensor unit 200 can advantageously operate with low cost or low quality sensors (or cameras) so adding additional sensors does not add much cost but improves robustness and reliability. Moreover, this allows generating a frame with an abundance of information while using computing resources more efficiently.

The RGB sensors/cameras 210 and IR sensors/cameras 220 can observe the environment or scene in the vicinity or at the front of the sensor unit 210. The RGB sensors/cameras 210 have overlapping field views. The RGB sensors/cameras are configured to receive (RGB) image data. Similarly, the IR sensors/cameras 220 have overlapping field of views. The IR sensors/cameras are configured to receive IR or depth image data. The sensor data (readings) from all sensors 210, 220 are fused or integrated to infer, reproduce or reconstruct the environment in which the vehicle moves and the vehicle motion.

The sensor unit 200 may be connected via an external bus 270 to a main computing unit 280 such as a regular lap top. The main computing unit 280 may be a laptop computer having an Intel i7 CPU with 2.5 GHz clock, 16 GB of RAM and GPU. The main computing unit 280 may be connected to a plurality of sensor units 200 such as 2, 3, 4, 6 or more sensor units 200) via the external bus 270. In various embodiments, the main computing unit 280 may be integrated in the sensor unit 200.

The sensor unit controller 268 is configured to collect sensor data (readings) from all sensors 210-250 and pre-processes these data. For example, it performs some first level processing such as adding timestamps to the sensor readings. Moreover, the sensor unit controller 268 may pre-integrate IMU or mag readings or adjust sensor such as GPS readings to the reading cycles of the main computing unit 280. It packages the readings in a uniform format and transmits them via the bus interface 264, 266 and the bus 270 to the computing unit 280. The sensor unit controller 268 may also run diagnostics that help monitor the accuracy or health of the sensors 210-250. For example, if an IMU 230 or a mag 240 is unstable or a sensor/camera 210, 220 is unavailable, the sensor unit controller 268 restarts it. In other embodiments, no sensor unit controller 268 is required and all these functions are performed by the main computing unit 280.

The main computing unit 280 may execute an inference loop that runs at a certain frequency such as 30 Hz. Of course the main computing unit 280 can execute the inference loop at other frequencies. As shown supra in FIG. 3, the loop may perform the following steps per iteration: (1) collect readings from the sensors (receive sensor data) at 310, (2) estimate sensor unit pose using readings from the most current iteration (only that iteration) at 320, (3) estimate sensor unit motion with information from past readings at 330, (4) generate gravity patches using readings from most current iteration at 340, (5) generate gravity patches using readings from past iterations at 350, (6) prepare for next iteration at 360, (7) publish and visualize the environmental representation at 370, and (8) calibrate the sensors periodically at 380. The main computing unit 280 is configured to perceive the environment as a series of (virtual) map frames.

Embodiments of the invention provide a frame of gravity patches or a map frame 400 for each iteration of the interference loop that represents the environment as shown in FIG. 4A. The map frame 400 is a representation of the environment or the scene detected by the sensor unit, or the field of view of the sensors/cameras of the sensor unit. The environment may be represented in the map frame 400 in real time (or near real time). A series of map frames 400 represents the sensor unit's trajectory or movement over time (discussed in more detail with respect to FIG. 6). In other words, the series of map frames (or environmental representations) provide what the sensor unit sees over time. Some of the frames 400 of the series of map frames (providing a trajectory of the sensor unit), may be marked as 'key frames' and others as 'regular frames' (see again FIG. 6).

The map frame 400 may comprise a plurality of patches 410 such as rectangular planar patches 410 (in alternative embodiments the patches may have other polygonal forms such as squares or hexagons). Each patch 410 may be a portion of the map frame 400 providing the environmental representation. Moreover, each patch orientation 410 may be expressed as (linear) functions of gravity and cardinal directions. The gravity-and-cardinal-direction-oriented planar patches 410 may be also called 'gravity patches.' Each gravity patch 410 represents a portion of the environment 415. In other words, each gravity patch 410 is a portion of the environment 415A mapped or projected to the gravity patch 410, wherein the gravity patch 410A includes information from all the RGB sensors/cameras, IR sensors/cameras, IMUs and optionally from past iterations (past information) and represents that portion of the environment 415A. The entirety of these gravity patches 410 forms the map frame 400.

Figure 3:
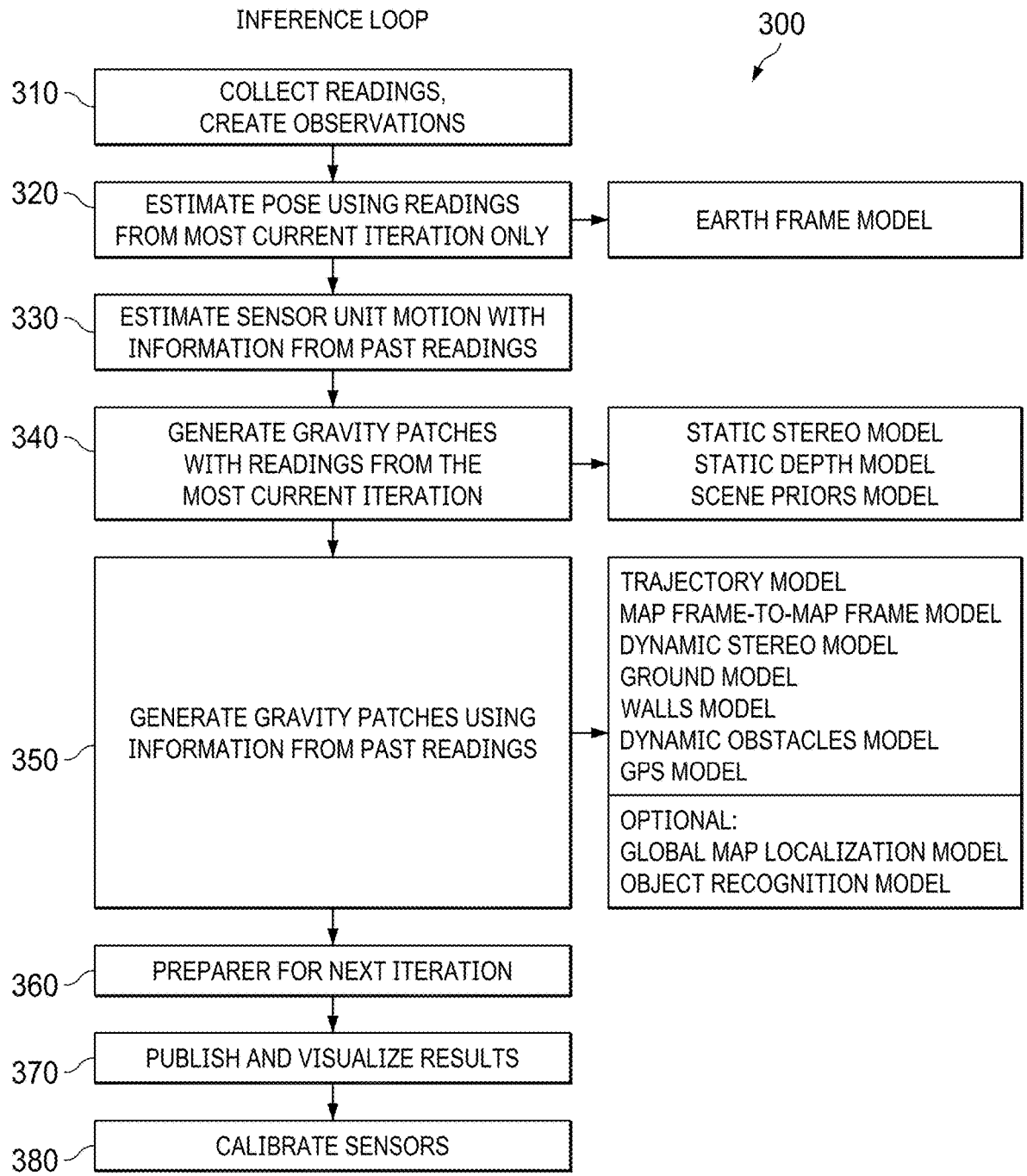
FIG. 3 shows a method for generating a map frame with a plurality of gravity patches.
Figure 4B:
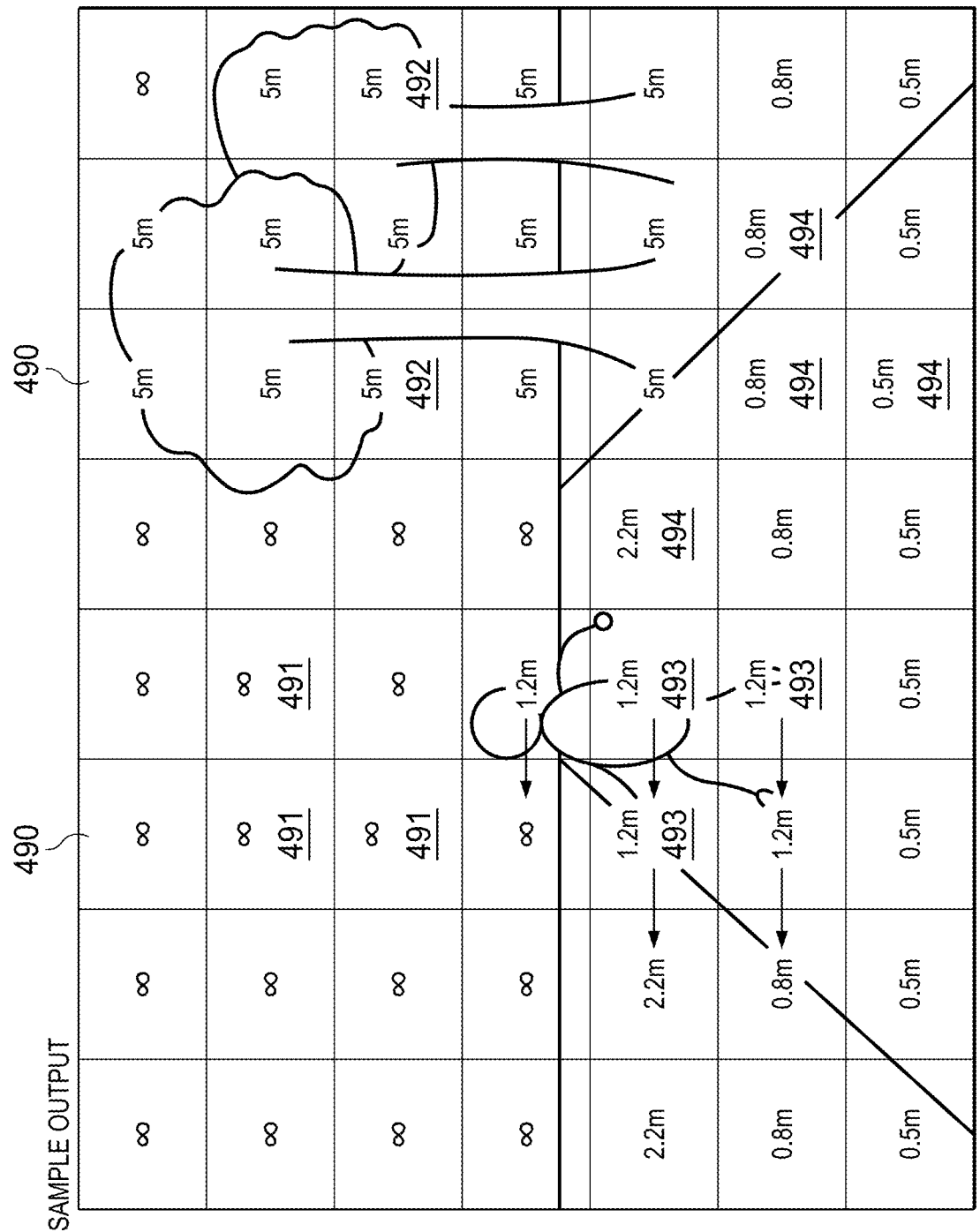
FIG. 4B shows an output of a map frame.

An image of the RGB sensor/camera is projected on the map frame, i.e., a pixel or pixels of the RGB image is assigned a location in a gravity patch 410. For a plurality of RGB sensors/cameras the RGB images are integrated and projected on the map frame 400. Similarly, for a plurality of IR sensors/cameras the IR images are integrated and projected on the map frame 400. The map frame 400 as a representation of the environment (e.g., scene) can be visualized. For example, the visualizable image of the map frame is published or visualized in step 370 as discussed with respect to FIG. 3. The visualizable image includes information for each patch such as a distance from the sensor unit to ground, obstacles, the sky and a velocity. The distance may be reciprocal of the distance, mean of distances of points on a patch, a mean of reciprocal of distances of points on that patch or another type of distance weighting for the patch. Based on this information, each patch 410 may be assigned one of the following four scene labels: (a) ground, (b) static obstacle, (c) moving object, and (d) far. FIG. 4B shows a visualized image (sample output) of a map frame of the environment at one point in time. Each region 490 represents a gravity patch 410. The regions 491 with the distances infinity represent sky (far), the regions 492 with the distances 5 m represent the tree (static obstacle), the regions 493 with distances 1.2 m represent a person (moving object) and the regions 494 with the various distances 0.5 m, 0.8 m and 2.2 m represent the grass and the path (ground). Regions identified as moving objects, e.g., regions 493, are assigned a non-zero velocity (the others are identified with a zero velocity). If an object recognition unit 291 operating an object recognition module is available, the patches 490 may be labelled with an object class label in addition to the scene labels. If a location recognition unit 292 operating a localization module is available, the patches 490 may be labelled with a location label in addition to the scene labels.

Figure 1B:
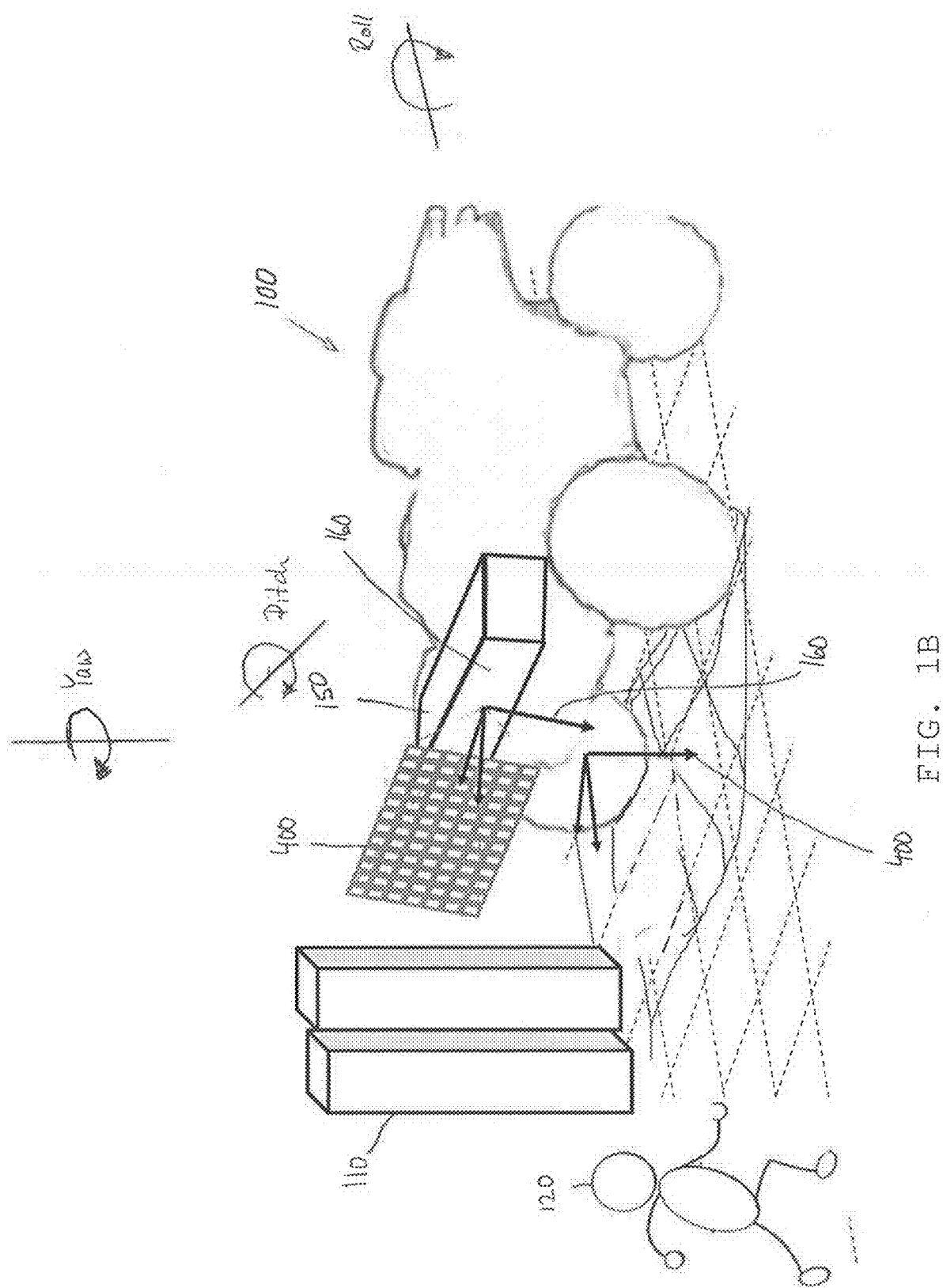
FIG. 1B shows an autonomous vehicle moving in an environment.

The sensor unit (represented by a virtual sensor unit frame or virtual machine frame) moves in 3-dimensional space while the vertical axis of the map frame 400 is fixed to ground (orthogonal to ground and parallel or antiparallel to gravitation). The vertical axis of the sensor unit is parallel to the sensor unit frame. The generation of the sensor unit frame 160 and map frame 400 coincide. The relationship of the map frame 400 to the sensor unit frame is known and the relationship of the sensors/cameras in the sensor unit to the sensor unit frame is known too (and discussed later). This is also shown in FIG. 1B.

The orientation of the map frame 400 can be defined in an embodiment as follows: 1) the y axis aligns with gravity; 2) the x-z plane is orthogonal to the y axis and 3) an angle between an x axis and the cardinal/magnetic north which lies in the x-z plane. The sensor unit frame 160 is aligned with the map frame 400 but has a 2-d rotation relative to the map frame 400. For example, the yaw angle is zero (aligned with the x-axis of the map frame 400) while the roll and pitch angles are often not aligned with the map frame 400, i.e., can be zero but are often different from zero.

Each map frame may have the following variables:
3-d rotation with one angle along cardinal plane (x-z plane) between the map frame x-axis and the cardinal/magnetic north, and the two rotation angles (e.g., roll and pitch) of the sensor unit frame relative to the map frame;
3-d translation of map frame from last key frame; and optionally further states to the map may be:

2-d GPS coordinates: latitude and longitude 6-d Pose (3-d rotation and 3-d translation) in the map of a building 2-d orientation and 1-d distance of the ground Each gravity patch may have the following variables:

3-d inverse depth;

gravity orientation;

cardinal direction orientation of the gravity patch in the map frame;

3-d mean and 6-d covariance of points for each patch;

3-d vector that represents the velocity of the patch in the map frame; and optionally further states to the map frame may be:

1-d Scene labels probabilities: ground, static obstacle, dynamic obstacle, far 1-d Object class probabilities such as probability of the patch being a person, sidewalk, tree etc. when an object classification computer is available.

Referring now again to FIG. 3. FIG. 3 shows a method 300 for generating a representation of the environment in a map frame comprising a plurality of gravity patches. The method calculates and estimates variables for the map frame and the gravity patches by using sensor readings from the sensor unit. The method 300 provides one map frame in one iteration and the map frame may be provided in real time or near real time.

The method 300 performs a series of steps in order to calculate and estimate the variables of all gravity patches in the map frame. By doing so, the method 300 provides a representation of the environment at a specific time in one iteration. Several iterations provide a series of representations of the environment over time.

In steps 310 and 330 an optimization problem is built and solved. Optimization problem solves a non-linear least squares problem that minimizes an objective function of the form: Sum f(x)^2. Here f(x) is a cost function that depends on the parameters x. The cost function is also known as a constraint. Parameters are variables that are changed by the solver to achieve a minimum value of the objective function. For example parameters may be the 3-d rotation and 3-d translation of the map frame. The cost function f(x) is squared (^2) in the objective function. Many different types of cost functions can be added in the objective function. Each type of cost function is created by a 'model.' A model is responsible for creating, calculating its cost functions and adding them to the objective function. Many models operate at the same time. For example, the static stereo model manages cost functions related to matching patches between different sensors/cameras. The dynamic stereo model manages cost functions related to matching patches between images from the same sensors/camera (over time). These models are described in the following sections.

In a first step 310, sensor data from all sensors are collected. The main computing unit receives sensor data from the RGB cameras/sensors, the depth cameras/sensors, the IMU(s), the mag(s) and the GPS(s). In each iteration, all sensors provide data to the sensor unit controller and main computing unit. Each reading can be converted into an 'observation' that can be used by the models for creating constraints. For example, the mag(s) provides mag data such as magnetic flux data that is used to determine (by calculating and estimating) the sensor unit's rotation with respect to earth's north, the IMU(s) provides IMU data such as the direction of gravity that is used to determine (by calculating and estimating) the sensor unit's orientation with respect to gravity, the GPS(s) provide GPS data that is used to determine the location of the sensor unit on earth, the RGB cameras/sensors provide RGB images or data that is used to determine a scene in front of the sensor unit, and the depth camera(s)/sensor(s) provide depth images or data, or IR images or data that is used to determine the scene in front of the sensor unit. The data from the IMU(s), the mag(s) and the GPS(s) provide the orientation (rotation), position and pose of the sensor unit (and therefore of the machine or vehicle) and the data from the RGB cameras/sensors and IR camera(s)/sensor(s) provide the image of scene or the field of view near the sensor unit. As discussed above, the sensor readings may be pre-prepared by the sensor unit controller and then forwarded to the main computing unit.

In the next step, at 320, the pose (orientation and position) of the sensor unit (e.g., machine) is calculated and estimated. The pose may be calculated and estimated based on a single reading of the sensors. The pose may be calculated and estimated based on the most current reading of the sensor unit in real time. Calculating and estimating the pose on a single most current reading of the sensors has the advantage that it allows quick recovery in case tracking is lost. Alternatively, the pose may be calculated and estimated on additional readings of the sensors.

The orientation may be calculated and estimated from the most current readings of the IMU(s) and the mag(s). A pose is defined as the position of the sensor unit (e.g., machine) and the orientation (rotation) of the machine.

Figure 5A:
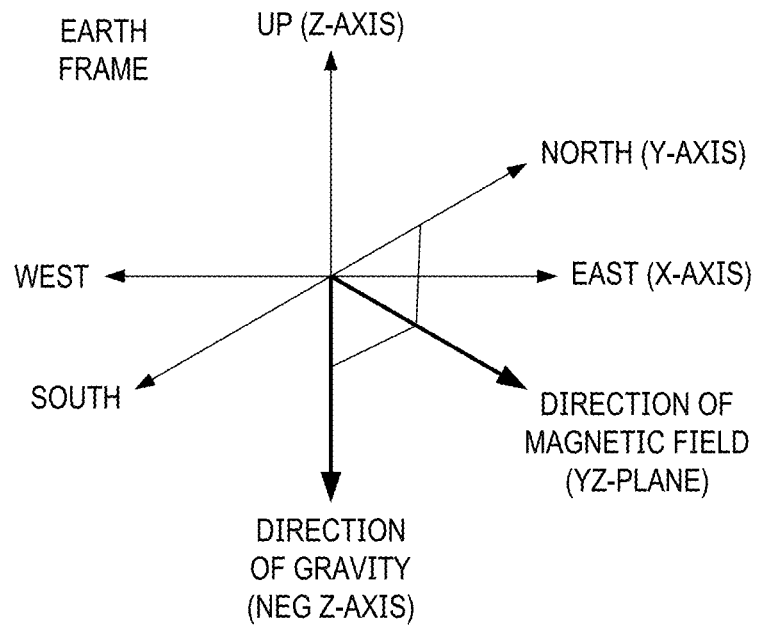
FIG. 5A shows a representation of the earth frame.

The orientation of the sensor unit may be represented by the orientation of the sensor unit in the earth frame. The earth frame is fixed and is represented by the coordinates of the earth. The earth frame may be defined such that the negative z-axis is oriented along the gravity and the earth's magnetic flux lies on the yz-plane as shown in FIG. 5A. The earth magnetic north may then be oriented along the y-axis with east pointing along the x-axis. Other definitions of an earth frame are possible too.

Mag(s)' flux readings are transformed by the current estimates of magnetometer model parameters. Each mag(s) reading provides the direction of magnetic flux in the magnetometer frame. The mag(s) provide magnetic flux data that is used to determine (by calculating and estimating) the sensor unit's rotation with respect to earth's north.

For each mag (magnetometer frame) the following variables are calculated and estimated:

2-d multipliers vector for yz axes of measured magnetic flux. A multiplier for x-axis may be equal to 1;

3-d bias vector for xyz axes; and 4-d extrinsic rotation quaternion on the sensor unit.

Each IMU reading is preprocessed to get the direction of gravity and quaternion representing rotation of IMU body frame from the time the IMU started taking measurements. This rotation estimate may drift heavily along the direction of gravity. The drift of each IMU is calculated and estimated for each iteration. For each IMU (IMU body frame) the following variables are calculated and estimated:

1-d rotational drift angle along the gravity direction; and 4-d extrinsic rotation quaternion on sensor unit (4d).

The main computing unit can calculate and estimate the orientation of the sensor unit based on these definitions, mag(s) readings and IMU reading and therefore provide the absolute rotation of the sensor unit relative to the earth frame.

In various embodiments multiple IMUs and mags are used. Accordingly, the system can handle a loss of a mag(s) or IMU(s). As long as at least one IMU and one mag are active and provide measurement data, the absolute rotation of the sensor unit and the machine can be calculated and estimated.

In various embodiments the IMUs' rotational drift along the gravity direction is continuously calculated and estimated (e.g., every cycle). The mag(s) provides the 'rotational anchor' for estimating the IMU(s) rotational drift. The mag(s) multipliers along the yz axes and the biases along the xyz axes are continuously calculated. The calculations are as follows: $^{MAG}f = m_{MAG} *^{MAG} f_{MEAS} + b_{MAG}$. Here $^{MAG}f_{MEAS}$ is the measurement, $b_{MAG}$ is the bias in magnetometer measurements and $m_{MAG}$ is the multiplier.

Figure 5B:
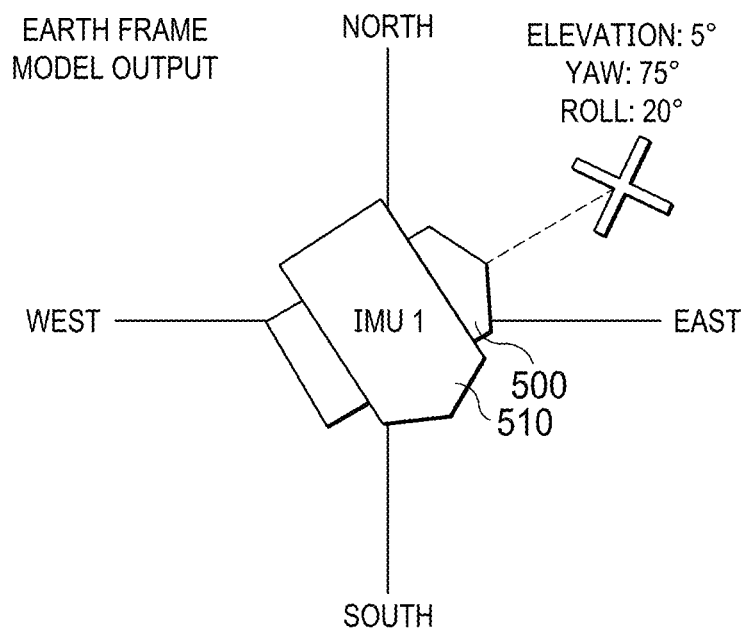
FIG. 5B shows an orientation a visualization of an orientation of the sensor unit in the earth frame.

The calculated and estimated sensor unit orientation (or machine orientation) can be visualized on a screen (either on a screen of the machine or on a remote computer). A representation of that visualization is shown in FIG. 5B. It includes a representation of a single IMU 510 supported by the sensor unit 500 in a cardinal direction. In this example, the sensor unit (including the machine) stands on or drives up a slope of 5 degrees (pitch) in a direction of 75 degrees from the cardinal north (yaw) and stands on or drives along a slant of 20 degrees (roll). Of course, FIG. 5B can show a sensor unit with more than one IMU.

In various embodiments, the GPS(s) readings can provide additional information about the position of the sensor unit on earth. The GPS(s) may be optional for operating the machine since the machine estimates its position in the environment using cameras and other sensors.

In the next step 330, the sensor unit calculates and estimates its motion and the motion of moving obstacles from current sensor readings (real time/near real time readings; this single iteration) and from past readings (prior iteration(s)). A detailed discussion how this is achieved follows below.

In the next step 340, the gravity patches are calculated and estimated using RGB image data of the RGB sensors/cameras and depth image data of the depth sensors/cameras from the single iteration. As discussed with respect to FIG. 4A the gravity patches are ordered or arranged in the map frame. The map frame may comprise 20×30 patches but can comprise various other numbers and arrangements of patches. The total number of patches include information about the "view" of the scene of the RGB sensors/cameras and the depth sensors/cameras. Individual patches include information about a partial view of the scene. In various embodiments, the frame of patches (all the patches) may represent the scene in front of the sensor unit (and machine). In alternative embodiments the frame of patches may represent the "view" of the vicinity of the machine (front plus side view(s), front plus rear view, etc.).

The orientation of the map frame relative to the sensor unit is known from step 320 (this determines the relation of those two). Gravity patches from the current map frame are projected onto or mapped to the RGB sensor/camera images and depth sensor/camera images using known extrinsic poses of the sensors/cameras on the sensor unit. In alternative embodiments, the images are projected onto the map frame.

The stereo image may be generated by matching the RGB images of the different RGB sensors/cameras applying the static stereo model and implementing depth information from the depth images by applying the static depth model. In some embodiments the static stereo model can be applied to the depth images as well. In yet other embodiments, the stereo image may include only depth information from the RGB images and not from the depth sensors/cameras.

The gravity patches from the current map frame are projected to a static image produced by generating a stereo image from the various RGB images matched with the depth information of the depth image(s). In various embodiments, the machine can be operated without the depth sensor(s) and the depth is only calculated based on the static stereo model applied to the RGB images. Alternatively, the machine can be operated without RGB sensors/cameras and only with IR sensors/cameras, e.g., for operation only at night. However, even RGB sensors/cameras can provide information at night since they can track a light source such as a bright street light or the moon.

In various embodiments the map frame with the patches can be projected on the stereo image so that gravity patches are produced, each gravity patch comprising a surface, a direction and a distance (depth) from the sensor unit to an environmental feature such as ground, obstacle or sky.

This can be described as an optimization problem P1. The problem may use stereo (disparity) equations from RGB image matches and depth equations from the depth images. These equations are created by the static stereo model and the depth image model respectively.

Static stereo model: Each RGB image is processed to prepare for stereo matching (see for more details FIG. 7). Each image may be converted to a gray-scale image, and corrected from a distorted to an undistorted image using intrinsic parameters (such as correction of abrasion of the lens distortion). For each image an x/y derivative image of the brightness may be calculated. Image pyramids for both gray-scale images and derivative images are built.

Stereo (disparity) observations: Gravity patch projections provide the centers and the corners of each gravity patch on the stereo image. The matching is provided for a pair of RGB images that have overlapping fields of view. An elliptical region in the target image where a point to be matched from the source image is calculated using known camera extrinsic poses (e.g., sensor/camera relationships in the sensor unit). The stereo matching is performed using the algorithm described in FIG. 7 (optical patch matching). This algorithm provides a mean and covariance matrix of the region in the target.

In various embodiments, when the sensor unit comprises three RGB sensors or cameras, the stereo image can be based on optical patch matching of camera 1 with camera 2, camera 2 with camera 3 and camera 1 with camera 3. Other permutations may be available for more than 3 RGB sensors or cameras.

In various other embodiments, when the sensor unit comprises two RGB sensors or cameras and two depth sensors or cameras, the stereo image can be based on optical patch matching of camera 1 and depth camera 1, camera 2 with depth camera 2 and camera 1 with camera 2. Other permutations may be available for more than two or more RGB sensors or cameras and more than two depth sensors or cameras.

Gravity patch constraints: Five (disparity) observations (one center and four corners) for each gravity patch are measured. The five observations are used to calculate and estimate the patch's depth, gravity orientation and cardinal orientation.

Each patch has (among others) 3 variables: (1) inverse (reciprocal) depth d; (2) gravity gradient of inverse depth $w_G$—meaning the rate of change of inverse depth along gravity direction; and (3) cardinal direction gradient of inverse depth $w_c$—meaning the rate of change of inverse depth along cardinal direction. Each patch has a defined half-width: $u_{patch}$ and half-height: $v_{Patch}$. The following equations may be used to calculate patch variables using depth measurements:

i. $d_{0,0} = d$, where $d_{0,0}$ is depth measurement at patch center;

ii. $d_{1,1}=d+w_G*v_{Patch}+w_C*u_{Patch}$, where $d_{1,1}$ is the depth measurement at top-right corner of the patch;

iii. $d_{-1,1}=d+w_G*v_{Patch}-w_C*u_{Patch}$, where $d_{-1,1}$ is the depth measurement at top-left corner of the patch;

iv. $d_{-1,-1}=d-w_G*v_{Patch}-w_C*u_{Patch}$, where $d_{-1,-1}$ is the depth measurement at bottom-left corner of the patch; and v. $d_{1,-1}=d-w_G*v_{Patch}+w_C*u_{Patch}$, where $d_{1,-1}$ is the depth measurement at bottom-right corner of the patch.

To identify and find patch-matching outliers, all constraints may use robust Huber norm. This down-weights the outliers. The constraint may be that the 4 corner measurements and the 1 center measurement for the gravity patch must lie approximately on the gravity patch surface such as the gravity patch plane. Accordingly, point-to-plane distance of a point to the approximate patch plane may be zero. The approximation may be measured as the smallest eigenvalue of the covariance matrix fitting the depth in the gravity patch.

Static depth model: Depth images may be filtered to remove large outliers. An image guided filter can be used to smooth the depth image. The gray image from the RGB sensors/cameras is used as a guidance image. For example, if a white plane exists in the gray image (based on the RGB image) and the depth image has a large discontinuity for that white plane the large discontinuity is filtered out.

Depth image observations: Gravity patches are projected on depth images of the depth sensors/cameras giving 2-d quadrangles (which may have any quadrangle form; the quadrangle form may not necessarily be a square or rectangle). Depth readings lying inside the projected quadrangles are used to generate observations for each gravity patch. Depth readings from all depth images are collected for every patch (the depth sensors have typically smaller apertures compared to RGB sensors so that typically a plurality of depth sensors are used to cover a stereo RGB image). Mean and covariance matrix of depth measurements are calculated. Then three (based on three dimensions x, y, z and the covariance matrix is a 3×3 symmetric matrix) eigenvalues and eigenvectors of the covariance matrix are calculated. Measures of sphericalness, planarity and linearness are calculated using the eigenvalues. Eigenvector corresponding to the smallest eigenvalue is taken as the patch normal vector observation. Measured mean's depth (e.g., z-value) is taken as the patch depth observation.

Depth image constraints: Measured patch normal and patch depth are used to directly constrain corresponding variables of the gravity patch. Following constraints are created: Difference between measured depth (based on depth sensor) and patch depth (based on RGB image) may be zero. 2-d angular error between gravity patch normal (based on depth sensor) and measured normal (based on depth sensor) may be a zero vector ($d_{MEAS}=d$ and $n_{MEAS}=n$. $d_{MEAS}$ is the inverse depth measurements, d is the inverse depth, n is the normal vector and $n_{MEAS}$ is the measured normal vector).

Scene prior model (surface continuity constraints) Surface continuity imposes that neighboring patches on a continuous surface should preferably fit or snap together. In various embodiments, for each central gravity patch (patches that do not lie on edge or corner of the map frame), four neighboring patches are considered. In alternative models, more or less than four neighboring patches are used (e.g., 6 or 8 patches). If the neighboring patch normal points in a similar direction, surface continuity imposes a penalty when the center of neighbor does not lie on the gravity patch plane. The following constraints may be created:

An angular threshold may be provided. When the angle(s) between the gravity patch normal (vectors) for neighbors is/are within an angular threshold, the angle(s) is/are considered to be zero (angular threshold may be less or equal to 10 degrees or less or equal 20 degrees). Here a constraint is created as $n_1=n_2$, where $n_1$ and $n_2$ are the normal vectors of the neighboring patches.

If neighbor's normal (vector) makes an angle smaller than the threshold with patch's normal (vector), neighbor's patch center may lie on the same gravity patch plane. Here a constraint is created as $w_{G0}*(u_0-u_1)+w_{C0}*(v_0-v_1)=d_0-d_1$, where $w_{G0}$ and $w_{C0}$ are the inverse depth gradients of patch, $u_0$ $v_0$ are the center coordinates of the patch, $d_0$ is the inverse depth of the patch, $u_1$ $v_1$ are center coordinates of the neighbor patch and $d_1$ is the inverse depth of the neighbor patch.

Planar ground model constraints (definition of ground): Ground is assumed to be planar in the immediate vicinity of the sensor unit. The immediate vicinity may be defined as less than 1 meter, less than 2 meters, or less than 3 meters. Ground plane may be modelled with 3 parameters:

2-d angles vector for normal vector (defined for pitch and roll, this vector may not specify the location); and 1-d distance of the plane (measured along the normal vector) to sensor unit origin (or the map frame origin).

Observation: Some candidate gravity patches may be selected to be associated with the ground plane using the following criteria:

Patch normal (vector) makes an angle less than the threshold with the gravity vector (e.g., less than or equal to 10 degrees, less than or equal to 20 degrees);

Patch center is located below the horizon at an angle greater that a threshold angle (e.g., threshold angle can be up to 15 degrees, up to 20 degrees, up to 25 degrees or up to 30 degrees below horizon). This may avoid considering patches close to and above the horizon as candidates for ground.

Patches that pass these criteria are used as candidates to create constraints for the planar ground model. The following constraints may be created:

Patch center distance from the ground plane is zero; and

Angle between ground plane normal and patch normal is zero.

All planar ground model constraints may be tempered with Huber norm to accommodate non-ground patches.

Static obstacle constraints (definition of obstacle): In a single iteration all obstacles are assumed to be static. Obstacles may be assumed to be standing on the ground with a surface having a normal that is perpendicular to gravity. Static obstacles model estimates the following variables:

Each column of gravity patches in the map frame has (1) a number of patches that belong to ground that start from bottom of the column to a first row, and (2) a number of patches that belong to 'obstacles' starts from the row above the row where 'ground' ends and extends to near or at the top of the map frame. If there are no 'obstacles' in a column, none of the patches in the column are marked 'obstacles'.

Static obstacles model divides the gravity patches map frame into three layers: a bottom 'ground' layer, an intermediate 'obstacles' layer and a top 'far' layer. The following constraints are assumed:

(At least some) patches in the bottom layer should belong to the planar ground model;

Patches in obstacles layer should not belong to the ground layer. They should be within a threshold of the depth value of each other. The threshold can be set to 1 meter. Alternatively, the threshold is set somewhere between 0.5 meter and 1.5 meters or 2; and Patches further up after the obstacle layer may be marked 'far.'

Static stereo model constraints, static depth model constraints and scene priors model constraints are added to the problem P1. The optimizer may reduce the energy to get the optimum estimate of gravity patches. As described with respect to the cost function(s) above each constraint (or cost function) is added to the objective function. The optimizer makes changes to parameters such as depths of the patches so that objective function is minimized.

Output of gravity patches estimation: Each gravity patch's inverse depth, patch's gravity and patch's cardinal orientation and the covariance matrix for each patch is calculated and estimated. Planar ground model and static obstacles model are also estimated.

At step 350, the motion of the sensor unit (e.g., machine) is calculated and estimated. Moreover, the gravity patches, based on the calculations and estimations of steps 320-340, may be improved or made stronger by integrating information from previous iterations (or sensor readings). These estimations may be made by integrating sensor data from a single past iteration or reading cycle or several past iterations or reading cycles into the current reading cycle. Integrating past data allows the method to do what it cannot do with data from a single iteration:

Calculate motion between two or more map frames;
Calculate moving obstacles; and
Increase certainty of current iteration estimates (quality of the information).

First, the map frame motion is estimated. Information from multiple sensors is fused together to calculate motion of the map frame:

Dynamic stereo matches between corresponding RGB images is performed (see again FIG. 7). Images from the current iteration are compared to images from the last key frame;

Gravity patch-to-gravity patch depth distributions (gravity patch to gravity patch from two different map frames should be the substantially the same adjusted for motion); and Optionally, odometry data such as IMU acceleration readings, tire rotation readings or highly accurate GPS readings can be used.

Least squares problem P2: A least squares problem is kept in memory that handles running residuals from current and past iterations. In various embodiments the problem size is kept limited as past map frames are marginalized. All constraints created by the current iteration are added to this problem. As explained above with respect to the cost functions a second optimization problem is used to estimate variables that use residuals from current and past iterations. Map frames older than 7 (or less 6, 5, 4, or more such as 8, 9, 10, 11, 12, 15 or 20) may be marginalized. Marginalization reduces the number of constraints being solved so that lesser computation power is required. Models that create these constraints are described now.

Trajectory model: The trajectory model predicts the motion of the current map frame using poses of past map frames. If IMU acceleration data is available, the trajectory model may use the translation from pre-integrated acceleration readings of the IMUs. If tire-odometry readings are available, translation reading can be generated coupled with a kinematic model of the vehicle. The trajectory model initiates the translation of the map frame. If needed, trajectory model adds velocity/acceleration states to the most current map frame. The trajectory model may add the following states to the map frame:

3-d velocity and 3-d acceleration to the map frame.

Constraints created by the trajectory model match the map frame translation with:

Rotation predicted by Earth frame model is used as a measurement with an empirically calculated covariance; Earth frame model provides rotation of the map frame in every iteration, $^{MAP}R_{EARTH}^{MODEL}$, where MAP is the map frame, EARTH is the Earth frame and $R^{MODEL}$ represents the 3-d rotation from Earth frame to Map frame predicted by the Earth frame model. Trajectory model measures rotation in the Earth frame, as $^{MAP}R_{EARTH}^{TRAJECTORY}$. The constraint added is:

$^{MAP}R_{EARTH}^{MODEL} * (^{MAP}R_{EARTH}^{TRAJECTORY})^{\wedge T} = I_3$ where AT is the transpose of the rotation matrix and $I_3$ is the 3×3 Identity matrix.

Translation predicted by a constant velocity model (simplest form) or constant acceleration model using past map frame poses; Trajectory model keeps translations in Earth frame where origin of translation is the starting position of the vehicle. These can be written as $^{EARTH}_{ORIGIN}T_{VEHICLE\ t}$ at time t.

The change in position (velocity) from time to t0 time t1 is calculated as:

$$^{EARTH}V_{VEHICLE\ t0} = {}^{EARTH}_{ORIGIN}T_{VEHICLE\ t1} - {}^{EARTH}_{ORIGIN}T_{VEHICLE\ t0}$$

Change in velocity (acceleration) from time t0 to t1 is calculated as:

$$^{EARTH}dV_{VEHICLE\ t0} = {}^{EARTH}V_{VEHICLE\ t0} - {}^{EARTH}V_{VEHICLE\ t1}$$

Constant velocity constraint is:
$^{EARTH}V_{VEHICLE\ t0} = 0$ where 0 is a 3×1 zero vector
Constant acceleration constraint is:
$^{EARTH}dV_{VEHICLE\ t0} = 0$ where 0 is a 3×1 zero vector Translation calculated by pre-integrating IMU readings; the IMU may provide acceleration readings from time t0 to t1 in the body frame of the IMU. Pre-integration of these readings double-integrates the acceleration readings to calculate change in position. This is done as follows:

IMU acceleration reading at time t in IMU body frame is $^{IMU}a_t$. Using IMU's known extrinsic rotation $^{IMU}R_{RIG}$ and estimate of rig rotation in earth frame $^{RIG}R_{EARTH}$, acceleration reading is transferred to the Earth frame as:

$$^{EARTH}a_t = {}^{EARTH}R_{RIG} * {}^{RIG}R_{IMU} * {}^{IMU}a_t$$

Several readings from time t0 to t1 are 'integrated in time' using summation as follows:

$$^{EARTH}\text{change\_in\_translation} = {}^{EARTH}V_{t0} * dt + \text{Sum}_{t0 \to t1} {}^{EARTH}a_t * dt',$$

where dt=t1 −t0 and dt' is the time difference between IMU readings.

Translation predicted by tire-rotation readings coupled with kinematic model of the vehicle (kinetic model may include that the vehicle can only drive forward, backward or along a curve but not sideways).

Tire rotation readings are related with the translation of the machine along the trajectory. The constraint is expressed as follows:

change_in_translation=Tire_diameter*rotation measured via rotational encoders.

Map frame-to-map frame motion model: Gravity patches encode the environmental features (such as surfaces) in front of the sensor unit. Motion of map frame from a previous frame can be calculated by looking at how the surface has changed. The map frame containing the gravity patches can be seen as a Gaussian Mixture distribution of depths. These ideas are used to build constraints between map frames to infer motion.

Figure 6:
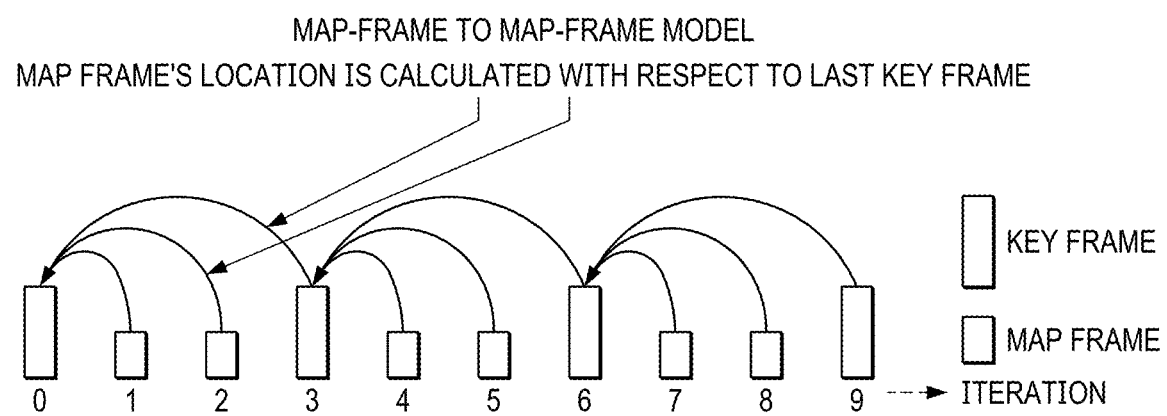
FIG. 6 shows a series of map frames over time.

Key Frame: Every Nth (e.g. N=3) map frame may be marked as a key frame as shown in FIG. 6. All map frames between the key frames are linked to the last key frame. The key frames are linked preceding newer key frames.

Map frame-to-map frame constraints: Gravity patches from the last key frame are projected onto the current map frame (or the current key frame). This establishes gravity-patch to gravity-patch correspondence between map frames. The projection may use the starting estimate of translation from the trajectory model, the rotation from the earth frame model and the current estimates of patch velocities. The gravity patches having non-zero velocities (belonging to dynamic objects) are projected with their velocities added to the velocity of the map frame. For each gravity-patch pair following constraint is created:

The distance (such as the L2 distance) between the two 3-d Gaussian distributions is approximately zero. First distribution is the gravity patch in the (last) key frame. Second distribution is the rotated and translated gravity patch in the current map frame (which could also be a key frame).

These constraints are added to problem P2. During optimization the estimates of translation and rotation will change. However, the association (patch to patch correspondence) initially established between gravity patches is not changed and is kept the same.

Dynamic stereo model: Dynamic stereo stands for the stereo pair formed by consecutive images of the same camera. Optical flow is computed between current frame RGB images and corresponding images of the key frame using the algorithm described with respect to FIG. 7 (optical patch matching). Measured optical flow is then used to infer motion between map frames.

Dynamic stereo observations: Key frame gravity patches are projected onto the current frame using latest estimates of map frame rotation/translation and the current estimate of the gravity patch velocities in the key frame. The patch velocities are used to warp the key frame to the timestamp of the current map frame. The optical matching is performed between the two images using projected gravity patch centers as source/target image locations. The optical flow measurements are then used to create dynamic stereo constraints.

Dynamic stereo constraints: For each optical flow measurement, corresponding to each gravity patch and dynamic stereo pair, one constraint may be added:

Optical flow calculated using depths of gravity patches of current and key frame, gravity patch velocities of key frame, and translation/rotation of current map frame must match the measured optical flow. Optical flow residual is a 2-d vector that is may be tempered by Cauchy loss function to account for outliers.

These constraints are added to problem P2. Robustification using the loss function may be necessary as optical flow typically has a number of incorrect optical matches in regions of low texture.

The vehicle's environment is assumed to be ground, standing or moving obstacles, and things that are far away. Using data from a single iteration, an initial estimate of these objects is available. Combining this initial estimate with past frames provides a more complete picture.

In a map frame, every column of gravity patches has three segments: ground, obstacles (standing or moving) and far. Ground is assumed to start from the bottom row of the map frame, going up the column and changing to obstacle or far. Obstacles start from where the ground ends to the top gravity patch row of the map frame or up the column where the column changes to far. Far starts from the top of the obstacles to the top of the gravity patch row of the map frame. Of course, in some embodiments, obstacles start for at least some of the columns already at the lowest row of the map frame.

Ground model: Ground is modelled as a plane with a normal that is parallel to the gravity for indoors operation. For outdoors operation, ground is assumed to be a spline surface with a given maximum slope (up to 10 degrees, up to 20 degrees).

Ground observations: All patches identified as ground in the 'Scene Priors Model' are considered ground in the (multi-iteration) ground model.

Ground model constraints: The following constraints are created for each identified 'ground' gravity patch:

Normal vector of gravity patch should match the normal predicted by the ground model; and Center of the gravity patch must lie on the ground surface (same as in the scene priors model).

All constraints are added to problem P2.

Walls model: preferably for in indoors operation, walls are dominant static obstacles. Walls model imposes the constraint that neighboring patches that are identified as a static obstacles should lie on the same plane. The walls model adds a 'building direction' angle variable. This angle may vary in a range (pi/4,−pi/4 ). The model assumes that walls are perpendicular to each other, also known as the Manhattan-World assumption. Accordingly, this model identifies walls effectively so that the machine can map a building effectively. Walls model imposes the following constraints on the neighboring patches:

i. $w_{G0}=0$ and $w_{G1}=0$ where $w_{G0}$ is the gradient of inverse depth along gravity direction for patch and $w_{G1}$ is the gradient of inverse depth along gravity direction for neighboring patch.

ii. $w_{C0}=w_{C1}$ where $w_{C0}$ and $w_{C1}$ are gradients of inverse depth of patch and its neighbor along the cardinal direction.

Walls model observations: Walls model infers the building angle and dominant wall-planes. First a histogram of cardinal directions of gravity patches identified as obstacles is built. Candidates are selected that are most likely to be associated with walls. Walls model constraints: Constraints are built only for candidate gravity patches.

Constraints are:

Building angle implied wall angle should match the gravity patch implied wall angle.

All constraints are added to problem P2. During optimization, estimates of gravity patch normal change. However, the initial associations are not changed.

Dynamic obstacles model: Dynamic objects in the environment are identified using gravity patches that move differently from what is implied by the motion of the sensor unit.

The model assumes that each dynamic object in the scene has a surface with a normal that is perpendicular to gravity and a non-zero velocity. The model further assumes that the velocity of dynamic obstacles remains constant between key frames. Finally, the model assumes that all gravity patches associated with dynamic obstacles in a single column of a map frame have the same velocity. In the following example it is assumed that only one moving object is present on the ground at one place (for more moving objects this assumption can be multiplied). The dynamic obstacles model adds the following states:

For each column of the key frame, a 3-d velocity is added. This represents the motion of the obstacle along ground and perpendicular to ground (flying). If needed flying velocity can be set to zero.

Dynamic obstacle observations: The dynamic stereo model already created patch matches that are used by this model. For each gravity-patch identified as an obstacle the following constraints are created:

If velocity of the obstacle patch is greater than zero, its velocity should be equal to the obstacle velocity for the key frame column.

If velocity is less than a threshold, it is set to zero. Threshold is experimentally determined and depends on the noise characteristics of depth cameras and resolution of the RGB cameras. It is typically set to a value between 0.1 m/s and 0.5 m/s, between 0.2 m/s and 0.5 m/s or between 0.4 m/s and 0.5 m/s.

All dynamic obstacle model constraints are added to problem P2.

GPS model: In outdoors operation when GPS signal is available, GPS model adds the earth's latitude/longitude to the map frame. The GPS measurements then connect the map frame locations using a GPS displacement model.

The GPS model adds the following states:

3-d vector for latitude, longitude and GPS-calculated altitude to each Map frame.

The GPS model adds the following constraints:

Translation of map frames is related with GPS coordinates using geodesic distance formula for the earth;

For every GPS reading received difference between measured GPS reading and model reading is set to zero. GPS measurement covariance is used to scale the readings.

All GPS model constraints are added to the problem P2.

Optimizer solves the problem. This includes all constraints from current iteration and from a (or a few) past iteration(s). All variables may be estimated. A sample output of the resulting environment is shown in FIG. 4B.

The steps 320-350 can be performed in the order disclosed, at the same time or in another suitable order.

In the next step, at step 360, the method 300 prepares for the next iteration. This includes the following:

Marginalization: The method may keep 5 to 7 past key frames in memory on which the solution of the problem P2 is based. Alternatively, the method may keep other numbers of key frames (less or more). At the end of every iteration, the method 300 checks if a new key frame is to be created. If so, the oldest key frame is dropped, removed or marginalized. This has the advantage that the method can operate with limited computing power and memory space and that the memory never overflows. The steps are as follows:

All map frames that link to this key frame are dropped;

All constraints related with environment object models are dropped;

In various embodiments, constraints directly linking the key frame to be marginalized with the penultimate key frame are kept;

In various embodiments, only the following variables of the key frame are kept: key frame's pose and gravity patch depths. All other variables are dropped; and Marginalization is carried out.

Initialize next iteration objects: The following preparation steps are carried out:

Initialize new map frame: A new map frame is initialized. Its gravity patches are initialized.

Key frame creation: If this is the $N^{th}$ map frame, next map frame as marked as key frame.

The method 300 can be integrated with external localization and object recognition modules. The external localization and object recognition modules could be integrated at the same or a lower operation rate than the standard operation rate of the method (i.e., not at each iteration). Assuming the standard operation rate is 30 Hz then data from external localization and object recognition could be implanted at a lower rate, e.g., 3 Hz, 1 Hz, 0.1 Hz, etc.

Global map localization model: Readings generated from an external localization model can be integrated in to the method 300. The following state may be added to the system:

2-d, 3-d or 6-d pose as produced by the localization module is added to each map frame. For example an indoor beacon-based positioning system may produce only a 2d location in a map. Whereas a LIDAR based positioning system may produce a 6-d pose in a map.

For each new map frame, localization pose is initiated along with map frame pose. Whenever the localization module reading is received a new constraint is created. Following constraints are created:

With each new map frame, a constraint linking map frame motion with localization system pose is created.

When a reading from localization module is received, a constraint linking the reading with predicted pose is created.

All constraints are added problem P2 and solved normally.

In the next step, at step 370, the results (environmental representation encoded in gravity patches of the map frame) may be published via a monitor, screen or display. The monitor, screen or display may be located on the sensor unit or the machine. In various embodiments, the monitor, screen or display can be located remotely, so that a user can observe the motion of the machine (or the motion of several machines) from a remote location (data may be transmitted to this remote location via wireless technology). The step may be optional.

In the step, at step 380, the sensors may be calibrated. This step is optional too.

In various embodiments an object recognition system such as the one in FIG. 2 (Object Recognition Unit 291) may be added to the sensor unit or machine so that it recognizes certain classes of objects in the environment. For example, objects like 'person', 'grass', 'tree', 'car', 'sky', etc. may be identified. The output is usually in form of pixel-wise probability of labels. If a recognition model is available, the output can be integrated into the presented method.

Object class-to-scene label mapping: For every class of objects recognized, a scene label can be added to the patch. For example 'person' or 'car' classes are dynamic obstacles, 'grass' is ground, 'tree' is a static obstacle and 'sky' is far. In order to utilize object classes following new states are added:

To each gravity patch, a class label probability vector is added. For example, if the number of classes is 10, a 10-vector is added to each patch. Each element of the vector gets a value between 0 and 1 denoting the probability that the patch belongs to that class.

Object recognition constraints: In various embodiments, at the end of every iteration, object classes are propagated to the next map frame. The following constraints are created:

Gravity patches associated with each other in consecutive map frames should have the same scene label. An error may be assigned to this assumption. For example if patch P0 and P1 were associated with each other (e.g. using optical flow) their scene label vectors should be identical.

Object class to scene label mapping must hold. For example, each 'grass' labelled patch must have a scene label of ground, each 'person' labelled patch must be associated with scene label of dynamic obstacle.

For every new set of class labels received:

Object category label may match the reading received. For example, the readings coming from the recognition engine at time t should match the scene labels. Patch_Label=Patch_Label_measured. Recognition engine may run at a much lower frequency than the iteration frequency. For example recognition engine may run at 2 Hz whereas iterations run at 30 Hz.

Accordingly, the recognition module aids the method 300 so that the method can better assign scene labels to the gravity patches. All residuals are added to problem P2.

Figure 7A:
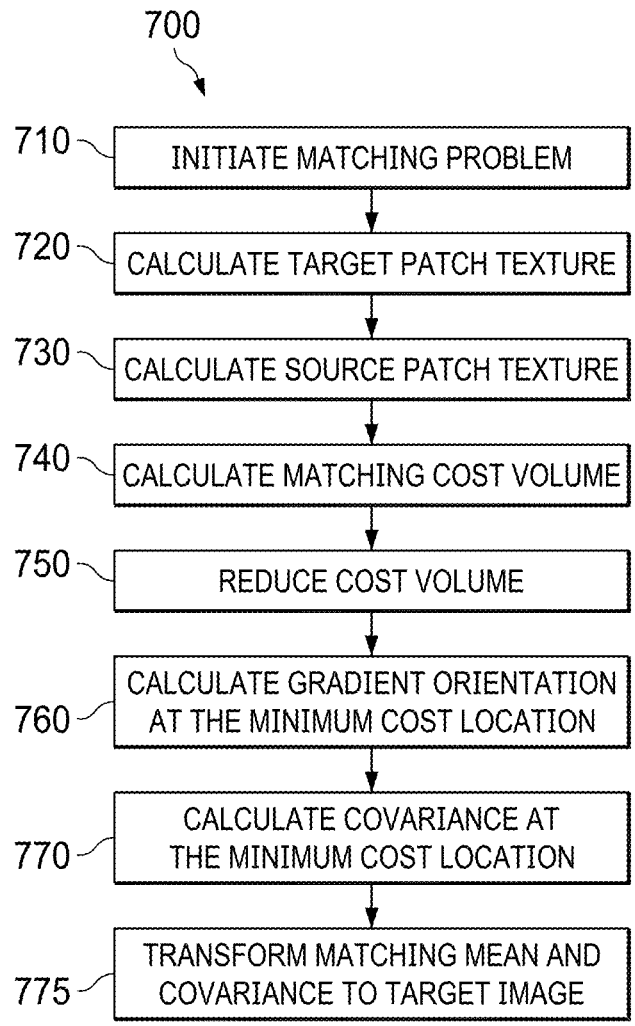
FIG. 7A shows a method for optical patch matching.
Figure 7B:
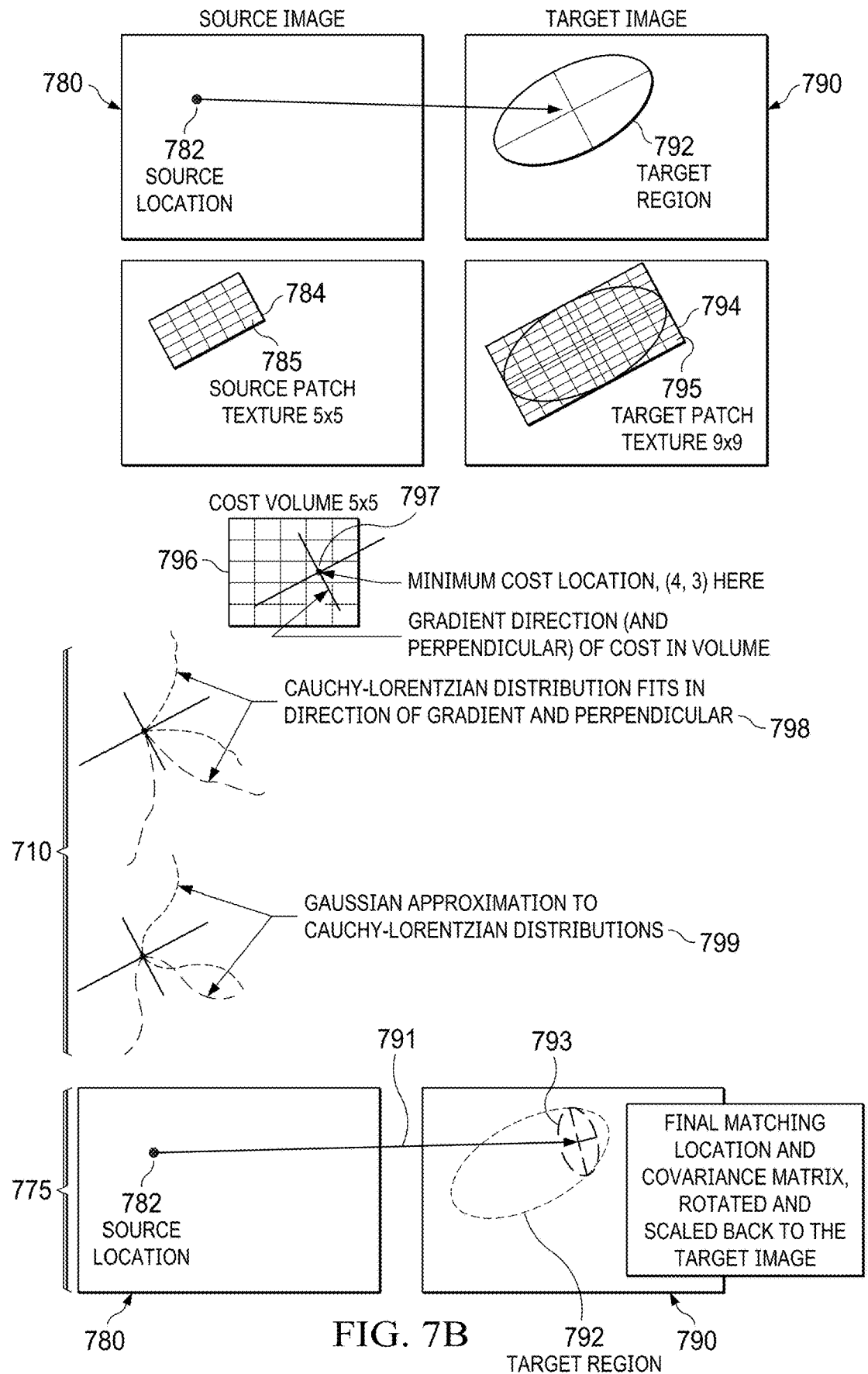
FIG. 7B shows source and target images for optical patch matching.
Figure 8:
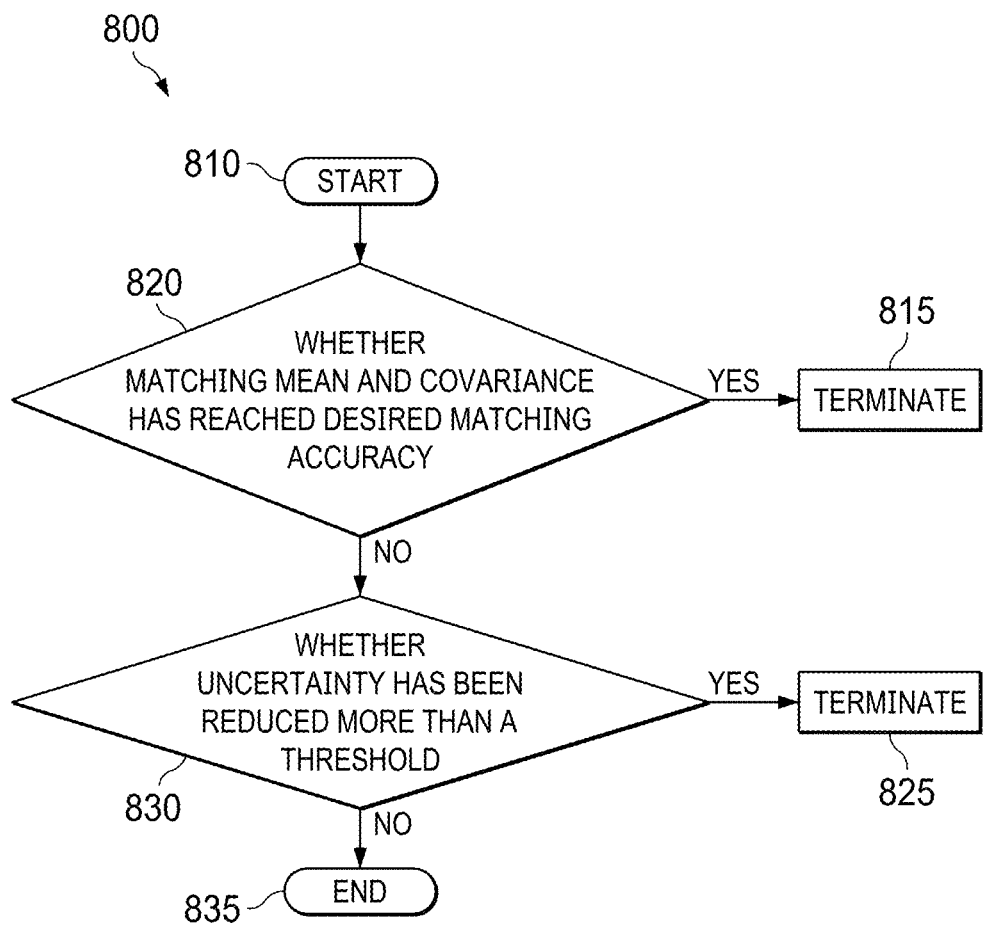
FIG. 8 shows an iterative method for optical patch matching.
Figure 9:
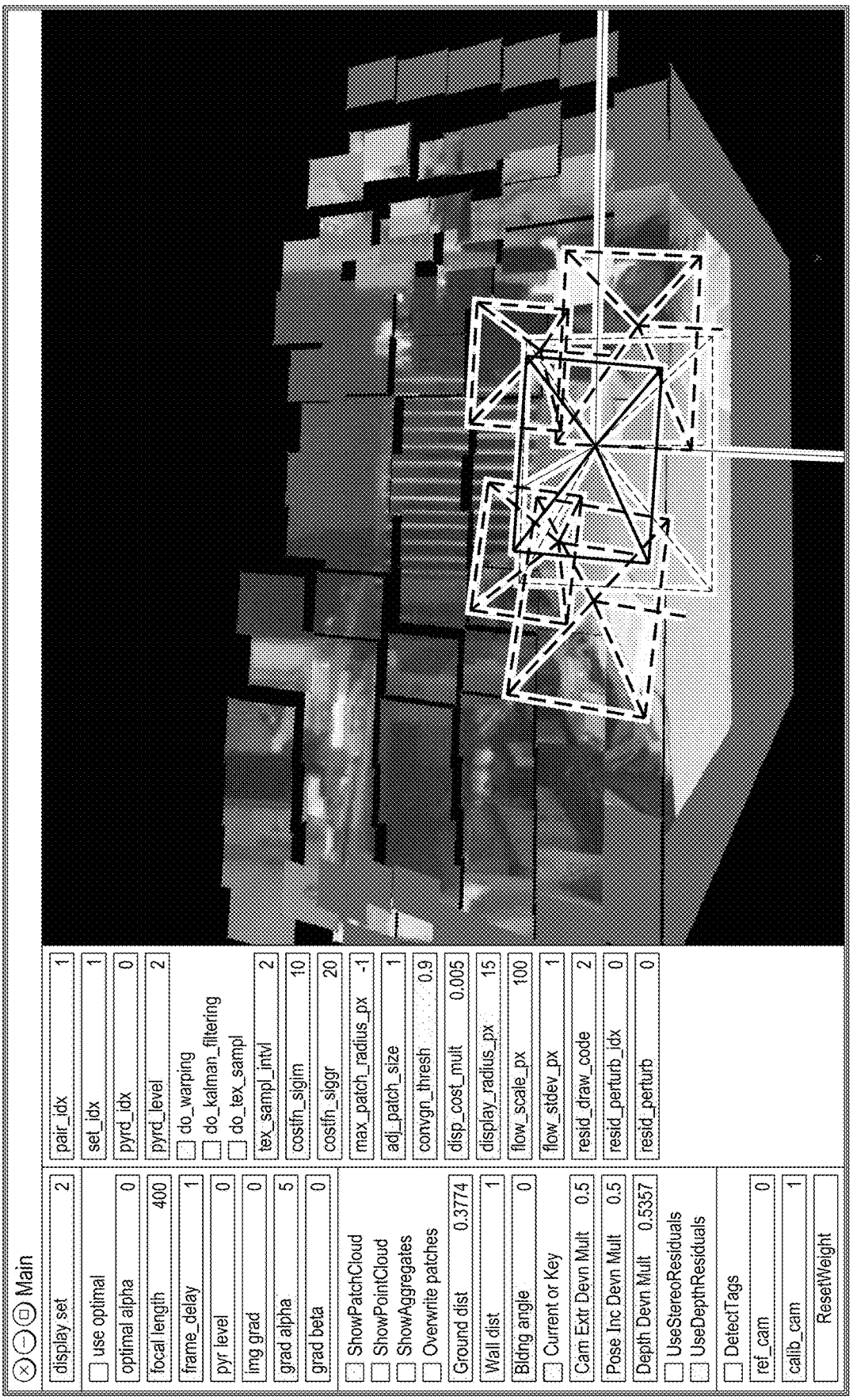
FIG. 9 shows an output of the gravity patches.

Embodiments of the invention provide an optical patch-matching method 700 shown in FIG. 7A. The algorithm is used to find stereo correspondences between images from different RGB sensors/cameras or consecutive images from the same RGB sensor/camera. The algorithm does not use points or lines for matching. Instead an entire texture of the optical patch is used for matching. This allows a more precise matching while using computing resources more efficiently. Diagrams helping to explain the optical patch-matching method 700 are shown in FIG. 7B.

Inputs for patch matching are:

Source and target images 780, 790, their x/y derivatives and their image pyramids (e.g., pyramids use power of 2);

Target image matching region 792, expressed as a 2×2 covariance ellipse and a mean;

Source image location 782 that is to be matched in target image 790;

Optionally, warping functions for x/y axes using 6 parameters are provided that are used to warp the source image for matching with the target image. Warp function allows adjusting for rotation between the images. It is also used when the patch is not parallel to the image plane.

In various embodiments an important setting of the method 700 is the dimension of source and target patch textures 784, 794 used for patch matching. For example, for a method in dynamic stereo matching, a source patch texture 784 of 5×5 and a target patch texture 794 of 9×9 can be used. For static stereo matching a source patch texture 784 dimensions of 5×5 and a target patch texture 794 dimension of 33×5 may be chosen. The dimensions for dynamic stereo matching and static stereo matching are different because the uncertainty of the matching problem is typically larger in the dynamic setting than in the static setting. In the static setting, the relationship between the different sensors/cameras is known. In various other embodiments the texture dimensions for the source patch texture and the target patch texture can be chose differently.

The output/result of the method 700 provides a mean and a covariance for each source location 782 of the source image 780 in the target image 790.

At step 710, a matching problem for each patch is initiated. A source location 782 for each patch of the source image 780 is identified. For example, the source location 782 could be the center and/or one of the four corner locations of the patch projected onto the source image 780. The same applies to the related target image 790. However, the location of the source location 782 in the target image 790 comprises not only the source location 782 but also an uncertainty. The uncertainty for the static patch matching is typically smaller than for the dynamic patch matching because the relationship of the RGB sensors/cameras in the static patch matching is more precisely known. The uncertainty can be expressed as a covariance matrix (e.g., with an assumed uncertainty). The target matching region 792 is treated as an ellipse calculated from the covariance matrix and the target mean (of the source location 782). The ellipse is the target matching region 792 of the source location 782 in the target image 790. The ellipse' major and minor axes are calculated (from the covariance matrix). The axes may be multiplied with a factor (e.g. 1 or 2) that may expand the matching area to be searched (e.g., 1 for static patch matching; 2 for dynamic patch matching).

In the next step, 720, the target patch texture 794 is selected. The target patch texture is selected based on the size of the ellipse. Larger ellipse need bigger target patch textures than smaller ones. Here, in an example, a 9×9 target patch texture 794 is selected. Other textures may be 7×7, 11×11, 15×15, 20×20 or anything in between (dynamic optical matching). Static optical patch matching may have different sizes such as 20×5, 25×5, 31×5, 40×5, 40×10 or anything in between. Texture unit size may be chosen based on available computing power. Larger texture size will increase the computing load as more number of matches will be calculated. For different problems, different patch sizes may be used. For example, for static stereo problem target patch has dimensions of 32×1. For dynamic stereo matching this is 9×9 or 11×11 if more compute power is available.

Patch element dimensions in pixels are calculated by dividing the target matching region 792 by the target patch texture dimensions (9×9). The color of each patch element 795 is the average color of all pixels of the underlying image 790. The average color is calculated by the image pyramid (640×480; 320×240; 160×120; 80×60). In order to calculate the level of pyramid smaller of the patch element dimensions is rounded to nearest power of two. Assuming the axes lengths of the uncertainty ellipses are $A_1$ and $A_2$, and assuming $A_1$ is the smaller of the two the number P is found such that $2^P=A_1$. P gives the pyramid level of the image used for calculation hence forth. When the uncertainty is high, P is large. Then a higher level pyramid is used.

In the next step 730, the source patch texture 784 is calculated. In this step source patch texture 784 of a given dimension (e.g. 5×5) is computed. The patch elements 785 of the source patch texture 784 may have the same dimensions as the patch elements 795 of the target patch texture 794. The source patch texture 784 may have the same orientation as the target patch texture 794. The source patch texture 784 is located around the source location 782 (patch 784 is centered at the source location 782). A source image at the calculated pyramid level is used.

In the next step 740, the matching cost volume is calculated. In this step the source patch texture 784 is 'matched' along all possible displacements in target patch texture 794, and a cost volume is calculated using a cost function. For example, in the dynamic model, if the source patch texture 784 has the dimension of 5×5 and target patch texture 794 has the dimension of 9×9, there will be 25 (5×5) displacement locations (or cost volumes) of the source patch texture 784 in the target patch texture 794 (9−5+1 along each axis of the texture 794). These different displacement locations (or cost volume) can be depicted as a 5×5 displacement matrix 796 (cost volume matrix or cost volume). In the static model, if the dimension for the source patch texture 784 is 5×5 and the dimension for the target patch texture 794 is 35×5, the cost volume 795 will be 31×1. The cost function calculates the differences between the pixels for each texture element 785/795 of the source patch texture 784 and the target patch texture 794 in each of the 25 locations.

In the next step, at 750, the cost volume is reduced. Reducing the cost volume means finding the minimum cost location (or the best match between the source patch texture 784 and the target patch texture 794 in the 25 locations). The matching function provides a small value (best match) when source and target texture elements 785/795 match and a large value when they do not. The location with the minimum difference is the minimum cost location (best match) in the cost volume 796. For example, as shown in FIG. 7B, the minimum cost location is location (4,3) 797 of the cost volume 796.

In the next step, at 760, the gradient direction/orientation at the minimum cost location 797 is calculated. Using the mean as the center, ridge regression may be used to calculate the direction of the gradient of the reduced cost function 797. In case of static stereo matching where displacement dimension for the y-axis is assumed to be 1, direction of gradient is assumed to be along the x-axis.

In the next step, at 770, the covariance at the minimum cost location 797 is calculated. In other words, this step identifies the uncertainty or the covariance of the minimum cost location (matching location).

Regular samples of 1/sqrt(exp(cost)−1) along the X and Y axes along the gradient directions are taken. Sample average provides with values of variances along the gradient axes 797. Lorentzian sample average is converted to Gaussian variance by matching 95 percentiles of the two distributions 799.

In various embodiments the distribution of the minimum cost location can be calculated by a Cauchy-Lorentzian distribution:

$$\text{Cost} = \text{Cauchy-Lorentzian}((I1-I2)/\text{sigma\_image}) + \\ \text{Cauchy-Lorentzian}((Gx1-Gx2)/\text{sigma\_grad}) + \\ \text{Cauchy-Lorentzian}((Gy1-Gy2)/\text{sigma\_grad}),$$

wherein I1, I2 are intensities of image 1 and image 2, wherein Gx1, Gx2, Gy1, Gy2 are x/y gradients of image 1 and image 2, and wherein sigma_image and sigma_gradient are a tradeoff factors between intensity difference and gradient difference. Cauchy-Lorentzian is defined as Cauchy-Lorentzian $(x) = \log(1+x^*x)$.

The patch radius setting lets the method control the influence of pixels further away from the patch center. Cost contributed by pixels lying outside the patch radius is reduced by increasing their sigma value by a factor provided in settings. The Cauchy-Lorentzian function is used to connect difference in pixel values to the probability that they match. The fat-tailed Cauchy-Lorentzian distribution may better model real world stereo matching challenges such as occlusions, light variations, dynamic objects than the Gaussian distribution.

In the next step, at 775, the minimum cost location (final matching location; matching mean) and the covariance matrix, rotated (if necessary) and scaled back (if necessary) is transferred back to the target image 790. The covariance calculated above is rotated and scaled to match the target image pixel elements 795. The following adjustments may be made: (1) rotation of cost function gradients, (2) pyramid level scale (3) target patch ellipse axes scale, and, (4) target patch ellipse rotation. The output of the method 700 is the matching mean 791 and covariance 793 calculated for each patch. The output covariance matrix (ellipse) is typically smaller than the target region 792 (ellipse).

The method may run on a GPU using multiple threads (e.g., parallel performance) for all the patches (in the patch frame). Thousands of locations across multiple images may be matched simultaneously. In various embodiments, the patch here is not the above described gravity patch but a "pre-patch." It is the projection of the map frame comprising the patches on one RGB image of one sensor/camera and a map frame comprising the patches on one RGB image of another sensor/camera at the same time. The patches of these two images are now compared (static stereo matching). Alternatively, it is the projection of a first map frame comprising the patches on a first RGB image of a sensor/camera and the projection of the second map frame comprising the patches on a second RGB image of the same sensor/camera at a later time. The patches of these two images are now compared (dynamic stereo matching). The method 700 can be performed for several images and several cameras in parallel (not just two or three).

The method 800 shows that the method 700 can be run iteratively. The method 800 starts (810) with the input to the decision block 820. The input is the matching mean 791 and the covariance 793. The decision block 820 evaluates whether the matching mean 791 and the covariance 793 have reached a preset matching accuracy. If yes, the method 800 is terminated at processing block 815. If no, the method 800 moves to the next decision block 830. At that block, the process evaluates whether the uncertainty has been reduced more than a threshold. If yes, the method 800 is terminated at processing block 825. If no, the method 800 moves to end block 835 which means that method 700 is restarted. Processes 700/800 can be reiterated several times. In various embodiments the threshold is 10%, i.e., the method must have been reduced about more than 90% to be terminated here. In various other embodiments, the threshold is 15%, 20% or 25%.

The following embodiments and aspects of the disclosure can be combined in all possible combinations and permutations.

In a first embodiment a method for autonomously operating a machine comprise receiving first sensor data from a first plurality of sensors supported by the machine, the first sensors covering a scene in a vicinity of the machine, generating a map frame comprising a plurality of gravity patches, and mapping the gravity patches and the first sensor data.

According to a first aspect of this embodiment the method further includes generating a machine frame, wherein the machine frame is movable with respect to the map frame.

According to a second aspect of this embodiment the map frame is always parallel or antiparallel to gravity, and the machine frame is fixed to the map frame with respect to yaw.

According to a third aspect of this embodiment each gravity patch is labelled and a label is selected from the group consisting of (a) ground, (b) static obstacle, (c) moving object, and (d) far.

According to a fourth aspect of this embodiment each gravity patch is further labeled with a velocity.

According to a fifth aspect of this embodiment the method further includes storing the generated map frame.

According to a sixth aspect of this embodiment the method further includes storing a plurality of k generated map frames, wherein the stored k map frames are map frames marked as key frames.

According to a seventh aspect of this embodiment k is less than 10.

According to an eighth aspect of this embodiment the method further includes generating a map frame between two consecutive key frames.

According to a ninth aspect of this embodiment the first plurality of sensors comprises more than two RGB sensors or cameras.

According to a tenth aspect of this embodiment the first plurality of sensors comprises more than two depth sensors or cameras.

According to an eleventh aspect of this embodiment the method further includes receiving second sensor data from a second plurality of sensors supported by the machine, the second sensors providing information about a pose of the machine.

According to a twelfth aspect of this embodiment the second sensor data comprises information about a cardinal direction of the machine on earth.

According to a thirteenth aspect of this embodiment the second sensor data comprises information about a direction of the machine relative to gravity.

According to a fourteenth aspect of this embodiment the second sensor data comprises information about a position of the machine on earth.

In a second embodiment a method for generating a current map frame comprising a plurality of patches comprises assigning the patches of the map frame to a stereo image so that each patch represents a portion of the stereo image, assigning a patch normal to each patch, the patch normal representing a direction of each patch relative to a gravity normal and relative to a cardinal direction of the map frame, and assigning a first patch depth to each patch, the first patch depth representing a first distance of each patch to an environmental feature.

According to a first aspect of this embodiment assigning the patch normal comprises assigning the patch normal based on a gravity patch surface.

According to a second aspect of this embodiment the gravity patch surface is a gravity patch plane.

According to a third aspect of this embodiment the gravity patch surface is defined by four corners and a center of the gravity patch.

According to a fourth aspect of this embodiment assigning the first patch depth comprises measuring four corners and a center of the gravity patch.

According to a fifth aspect of this embodiment the method further includes assigning depth images to the patches of the map frame so that each patch represents a portion of the depth image; and assigning a second patch depth to each patch, the second patch depth representing a second distance of each patch to the environmental feature.

According to a sixth aspect of this embodiment the second patch depth is based on a mean and a covariance of a depth measurement for the patch.

According to a seventh aspect of this embodiment the second patch depth is a z-value of an eigenvector corresponding to the smallest eigenvalue.

According to an eighth aspect of this embodiment the method further includes neighboring patches provide a continuous surface when the patch normal for each of neighboring patches is equal or below an angular threshold.

According to a ninth aspect of this embodiment the angular threshold is between 10 degrees than 20 degrees inclusive.

According to a tenth aspect of this embodiment the centers of neighboring patches lie on the same patch plane when the normal of these patches are within the angular threshold with each other.

According to an eleventh aspect of this embodiment the method further includes identifying a patch as a ground patch, wherein the ground patch is a patch representing the environmental feature in an immediate vicinity of a sensor unit.

According to a twelfth aspect of this embodiment identifying the patch as the ground patch comprises identifying the patch representing the environmental feature in the immediate vicinity of the sensor unit as ground patch when the patch normal of the patch is within an angular threshold of the gravity normal.

According to a thirteenth aspect of this embodiment the angular threshold is between 10 degrees and 20 degrees inclusive.

According to a fourteenth aspect of this embodiment identifying the patch as the ground patch comprises selecting the patch when a patch center is located below a horizon at an angle greater than a threshold.

According to a fifteenth aspect of this embodiment the method further includes identifying patches at bottoms of columns of the map frame as ground patches.

According to a sixteenth aspect of this embodiment the method further includes identifying patches at tops of columns of the map frame as far patches.

According to a seventeenth aspect of this embodiment the method further includes identifying patches at a bottom of the map frame as ground, identifying patches at a top of the map frame as far, and identifying patches that are neither ground nor far as obstacles.

According to an eighteenth aspect of this embodiment adding a velocity to the current map frame based on a past map frame.

According to a nineteenth aspect of this embodiment the method further includes adding a velocity to each patch.

In a third embodiment a method for generating a series of map frames comprises generating a first map frame comprising a first plurality of patches, each patch comprising a distance to an environmental feature and generating a second map frame comprising a second plurality of patches, the second map frame being generated after the first map frame, each patch of the second map frame comprising a distance to the environmental feature.

According to a first aspect of this embodiment the method further includes assigning a first velocity to the first map frame and assigning a second velocity to the second map frame.

According to a second aspect of this embodiment the method further includes assigning a first pose of a sensor unit to the first map frame, the first pose being based on first GPS data, first magnetic flux data and first gravitation data and assigning a second pose of the sensor unit to the second map frame, the second pose being based on second GPS data, second magnetic flux data and second gravitation data, wherein the second pose is also estimated based on velocity data of the sensor unit and the first pose.

According to a third aspect of this embodiment the velocity is measured based on (previous) IMU (accelerometer) readings.

According to a fourth aspect of this embodiment the velocity is measured based on odometry readings.

According to a fifth aspect of this embodiment the first plurality of patches with a plurality of first distances to environmental features are defined as a first Gaussian Mixture distribution of depths, wherein the second plurality of patches with a plurality of second distances to the environmental features are defined as a second Gaussian Mixture distribution of depths, and wherein a distance between the first Gaussian Mixture distribution of depths and the second Gaussian Mixture distribution of depth is approximately zero.

According to a sixth aspect of this embodiment the first map frame is marked as a key frame, and wherein the second map frame is not marked as a key frame.

According to a seventh aspect of this embodiment the first map frame is marked as a first key frame, and the second map frame is marked as a second key frame.

According to an eighth aspect of this embodiment the method further includes generating additional map frames between the first key frame and the second key frame, wherein the additional map frames are not marked as key frames.

In a fourth embodiment a method for matching two images comprises identifying, by a main computing unit, a source location in a source image, identifying, by the main computing unit, a target region in a target image related to the source image, selecting, by the main computing unit, a source patch texture around the source location, selecting, by the main computing unit, a target patch texture over the target region, calculating, by the main computing unit, a cost volume, reducing, by the main computing unit, the cost volume and matching, by the main computing unit, the source location in the source image to a target location in the target image, wherein matching the source location to the target location comprises matching the locations with a likelihood.

According to a first aspect of this embodiment reducing the cost volume comprises calculating a minimum cost.

According to a second aspect of this embodiment the method further includes calculating a matching distribution for the minimum cost.

According to a third aspect of this embodiment the matching distribution is a Cauchy-Lorentzian distribution.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method comprising:
   receiving sensor data from a plurality of sensors supported by a vehicle, the plurality of sensors covering a scene in a vicinity of the vehicle;
   generating a map frame comprising a plurality of gravity patches; and
   mapping the plurality of gravity patches and the sensor data so that the gravity patches of the map frame is a representation of the scene,
   wherein each gravity patch represents a portion of the scene, and
   wherein each gravity patch is assigned a label and the label is selected from the group consisting of ground, obstacle, and far; and
   generating a sensor unit frame representing a sensor unit attached to the vehicle,
   wherein the sensor unit frame is fixed to the map frame with respect to a yaw angle so that yaw angle between the sensor unit frame and the map frame is 0 and so that the sensor unit frame is not fixed with respect to a roll angle and a pitch angle when the vehicle moves in a 3-dimensional space.

2. The method of claim 1, wherein the label far is allocated to a gravity patch for an infinite distance measurement of a portion of the scene allocated to the gravity patch.

3. The method of claim 1, wherein the label ground is allocated to a gravity patch when the portion of the scene allocated to the gravity patch is a plane and when a normal of the plane is parallel to gravity.

4. The method of claim 1, wherein the label ground is allocated to a gravity patch when the portion of the scene allocated to the gravity patch is a spline surface with a maximum slope of up to 20 degrees.

5. The method of claim 1, wherein the plurality of gravity patches are arranged in rows and columns in the map frame, wherein the label ground is allocated to each gravity patch of a bottom row of the map frame, wherein the label far is allocated to each gravity patch of a top row of the map frame, and wherein the label ground, obstacle or far is allocated to gravity patches in rows between the bottom row and the top row.

6. The method of claim 1, wherein the label obstacle is allocated to a gravity patch when the portion of the scene allocated to the gravity patch includes an identified object, and wherein a surface of the object has a normal perpendicular to gravity.

7. The method of claim 1, wherein each gravity patch includes information about a distance between the vehicle and a portion of the scene allocated to the gravity patch.

8. The method of claim 1, wherein each gravity patch with the label obstacle comprises a further label of a velocity for the obstacle.

9. The method of claim 1, wherein each gravity patch represents at least hundreds of pixels of a sensor image showing a portion of the scene allocated to the gravity patch.

10. The method of claim 1, wherein the map frame is always oriented parallel or antiparallel to gravitation.

11. The method of claim 1, wherein the plurality of sensors comprises more than two RGB sensors or RGB cameras.

12. The method of claim 11, wherein the plurality of sensors further comprises more than two infrared (IR) sensors or IR cameras.

13. The method of claim 1, further comprising providing a pose of the vehicle, wherein the pose comprises a position of the vehicle and an orientation of the vehicle relative to earth's magnetic north.

14. The method of claim 1, further comprising:
   identifying whether or not an obstacle is in a desired pathway of the vehicle based on labeling of the gravity patches; and
   directing the vehicle around the obstacle when an alternative pathway around the obstacle is identified and stopping the vehicle when no alternative pathway around the obstacle is identified.

15. The method of claim 1, wherein the vehicle includes a vessel or an aircraft.

16. The method of claim 1, further comprising displaying the map frame on a screen.

17. A vehicle comprising:
   a processor; and
   a non-transitory computer-readable storage medium configured to store a program for execution by the processor, the program including instructions to:
   receive sensor data from a plurality of sensors supported by the vehicle, the plurality of sensors covering a scene in a vicinity of the vehicle;
   generate a map frame comprising a plurality of gravity patches; and
   map the plurality of gravity patches and the sensor data so that the gravity patches of the map frame is a representation of the scene, wherein each gravity patch represents a portion of the scene, wherein each gravity patch is assigned a label and the label is selected from the group consisting of ground, obstacle, and far, and wherein each gravity patch further includes the following variables: 3-d depth, gravity orientation and cardinal direction orientation of the gravity patch in the map frame.

18. The vehicle of claim 17, wherein each gravity patch with the label obstacle comprises a further label of a velocity for the obstacle.

19. The vehicle of claim 17, wherein the 3-d depth is an inverse 3-d depth.

20. The vehicle of claim 17, wherein the program includes further instructions to generate a sensor unit frame representing a sensor unit attached to the vehicle, wherein the sensor unit frame is fixed to the map frame with respect to a yaw angle so that yaw angle between the sensor unit frame and the map frame is 0 and so that the sensor unit frame is not fixed with respect to a roll angle and a pitch angle when the vehicle moves in a 3-dimensional space.

* * * * *